(12) United States Patent
Eilam et al.

(10) Patent No.: US 9,317,410 B2
(45) Date of Patent: *Apr. 19, 2016

(54) TESTING FUNCTIONAL CORRECTNESS AND IDEMPOTENCE OF SOFTWARE AUTOMATION SCRIPTS

(71) Applicant: International Business Machines Corporation, Armonk, NY (US)

(72) Inventors: Tamar Eilam, New York, NY (US); Waldemar Hummer, New York, NY (US); Fabio A. Oliveira, White Plains, NY (US); Florian Rosenberg, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 13/839,947

(22) Filed: Mar. 15, 2013

(65) Prior Publication Data

US 2014/0282433 A1  Sep. 18, 2014

(51) Int. Cl.
*G06F 11/36* (2006.01)

(52) U.S. Cl.
CPC ........ *G06F 11/3688* (2013.01); *G06F 11/3664* (2013.01); *G06F 11/3672* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 5,870,539 A * | 2/1999 | Schaffer | 714/38.13 |
| 6,044,393 A | 3/2000 | Donaldson et al. | |
| 6,332,217 B1 | 12/2001 | Hastings | |
| 6,795,966 B1 | 9/2004 | Lim et al. | |
| 6,944,860 B2 | 9/2005 | Schmidt | |
| 7,430,559 B2 | 9/2008 | Lomet | |
| 7,761,538 B2 | 7/2010 | Lin et al. | |
| 8,145,959 B2 | 3/2012 | Mims et al. | |
| 2003/0037314 A1* | 2/2003 | Apuzzo et al. | 717/125 |
| 2009/0300057 A1 | 12/2009 | Friedman | |
| 2009/0300149 A1 | 12/2009 | Ferris et al. | |
| 2012/0284696 A1* | 11/2012 | Koskinen | 717/126 |

OTHER PUBLICATIONS

Marcus Brunner "Self-Managing Distributed Systems", Oct. 2003, Springer.*

(Continued)

*Primary Examiner* — Li B Zhen
*Assistant Examiner* — Amir Soltanzadeh
(74) *Attorney, Agent, or Firm* — Fleit Gibbons Gutman Bongini & Bianco PL; Thomas Grzesik

(57) ABSTRACT

Various embodiments automatically test software automation scripts. In one embodiment, at least one software automation script is obtained. The software automation script is configured to automatically place a computing system into a target state. A plurality of test cases for the software automation script is executed. Each of the plurality of test cases is a separate instance of the software automation script configured based at least on one or more different states of the computing system. The software automation script is determined to be one of idempotent and non-idempotent and/or one of convergent and non-convergent based on executing the plurality of test cases.

8 Claims, 14 Drawing Sheets

(56) References Cited

OTHER PUBLICATIONS

Hla, K.H.S., et al., "Applying Particle Swarm Optimization to Prioritizing Test Cases for Embedded Real Time Software Retesting," 2008 IEEE 8th Annual International Conference on Computer and Information Technology Workshops, copyright Citworkshops 2008, ISBN: 978-0-7695-3242-4.

Eng, B.T., et al., "Implementation of ASTER Science Standard Data Product Requirements in the EOSDIS System," Earth observing system 2820 (1996): 218.

Lidauer, M.,et al., "Multiple-Trait Random Regression Test-Day Model for all Lactations," Interbull bulletin, 2000.

Arora, A.,et al., "Delay-Insensitive Stabilization," cse.ohio0-state.edu (1997).

Couch, A.,et al., "On the Algebraic Structure of Convergence," 14th IFIP/IEEE International Workshop on Distributed Systems: Operations and Management (DSOM) 2003.

Whitaker, A., et al., "Configuration Debugging as Search: Finding the Needle in the Haystack." 6th Symposium on Operating Systems Design and Implementation, Oct. 2004, pp. 77-90, USENIX Association OSDI 2004.

Offutt, J., et al., "Generating test data from state-based specifications." Software testing, verification and reliability, Feb. 5, 2003, pp. 25-53, vol. 13, DOI: 10.1002/stvr.264. Copyright 2003 John Wiley & Sons, Ltd.

Van Der Burg, S., et al., "Automating System Tests Using Declarative Virtual Machines." 21st IEEE International Symposium on Software Reliability Engineering, Nov. 1-4, 2010, pp. 1-10. San Jose, CA, USA.

Non-Final Office Action dated Sep. 11, 2014 received for U.S. Appl. No. 14/031,099.

Final Office Action dated Apr. 22, 2015, received for U.S. Appl. No. 14/031,099.

Puppet Labs, "Puppet Labs: IT Automation Software for System Administrators," downloaded Jun. 22, 2015, pp. 1-3, http://puppetlabs.com.

Chef, "How Chef Works," downloaded Jun. 22, 2015, pp. 1-11, http://www.opscode.com/chef.

Non-Final Office Action dated Oct. 20, 2015 received for U.S. Appl. No. 14/031,099.

\* cited by examiner

TESTING FUNCTIONAL CORRECTNESS AND IDEMPOTENCE OF SOFTWARE AUTOMATION SCRIPTS

BACKGROUND

The present invention generally relates to software testing, and more particularly relates to testing functional correctness and idempotence of software automation scripts.

Due to the competitiveness of the computing industry, software developers are pressured to quickly deliver new code releases and features. In contrast, operators are expected to keep production systems stable at all times, consuming new code at a slower-than-ideal pace. This phenomenon is chiefly caused by operators' developing automation code to deploy applications to production without following the rigor of software engineering. Organizations have started to adopt Infrastructure as Code (IaC) tools to help operators write automation code more efficiently to overcome the development operations barrier. Automation code written with such tools generally need to comprise a series of idempotent steps to guarantee repeatability and convergence to a desired state. However, the idempotent abstractions supported by such tools are frequently not sufficient for complex tasks, causing traditional scripting to be embedded in IaC code.

BRIEF SUMMARY

In one embodiment, a method for automatically testing software automation scripts is disclosed. The method comprises obtaining at least one software automation script. The software automation script is configured to automatically place a computing system into a target state. A plurality of test cases for the software automation script is executed. Each of the plurality of test cases is a separate instance of the software automation script configured based at least on one or more different states of the computing system. The software automation script is determined to be one of idempotent and non-idempotent and/or one of convergent and non-convergent based on executing the plurality of test cases.

In another embodiment, an information processing system for automatically testing software automation scripts is disclosed. The information processing system comprises a memory and a processor that is communicatively coupled to the memory. A testing module is communicatively coupled to the memory and the processor. The testing module is configured to perform a method. The method comprises obtaining at least one software automation script. The software automation script is configured to automatically place a computing system into a target state. A plurality of test cases for the software automation script is executed. Each of the plurality of test cases is a separate instance of the software automation script configured based at least on one or more different states of the computing system. The software automation script is determined to be one of idempotent and non-idempotent and/or one of convergent and non-convergent based on executing the plurality of test cases.

A computer program product comprising a computer readable storage medium containing computer code that, when executed by a computer, implements a method for automatically testing software automation scripts. The method comprises obtaining at least one software automation script. The software automation script is configured to automatically place a computing system into a target state. A plurality of test cases for the software automation script is executed. Each of the plurality of test cases is a separate instance of the software automation script configured based at least on one or more different states of the computing system. The software automation script is determined to be one of idempotent and non-idempotent and/or one of convergent and non-convergent based on executing the plurality of test cases.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Computer applications are typically comprised of multiple software components, which are configured and deployed on a multitude of computing machines. For example, assume a complex Web application comprising a database cluster and multiple application servers to handle user requests. Further assume that the database cluster comprises "master" node and multiple "slave" nodes. The software components need to be installed and configured correctly to ensure the correct functioning of the overall system. Particularly, there may be dependencies among the configuration parameters for a component and even more complex configuration dependencies among the individual components, thereby rendering the automation process a non-trivial task. For instance, in the above example, all nodes in the database cluster need to be configured with the network address (e.g., IP address) of the master node that controls the cluster. Therefore, in order to obtain this network address, the master node needs to be deployed and configured before the slave nodes are deployed. Real-world scenarios include many examples of complex dependencies among the individual steps (or tasks) of an automation.

With the advent of Cloud Computing and the increasing prevalence of virtualized environments, deployment and configuration of such applications is no longer static or bound to a certain infrastructure. In practice, applications are frequently scaled out, redeployed, or entirely migrated to new environments, governed by influencing factors such as cost of service delivery or service level agreements (SLAs) with customers. To provide for systematic and easily repeatable automations, the automation logic generally needs to be explicitly encoded in automation scripts. This leads to "Infrastructure as code" as a key concept to materialize complete configurations of how to provision complete Information Technology (IT) environments, following key concepts and best practices in software engineering.

Essentially, automation scripts are responsible to get the system into a desired state. The system state is composed of a set of state properties (e.g., running services, open network ports, file system contents, or installed software packages), which are discussed in greater detail below. The system states before and after execution of the automation scripts are referred to as pre-state and post-state, respectively. The automation scripts generally should be repeatable and capable of achieving the desired system state starting from any arbitrary pre-state. Therefore, the concept of idempotence is important with respect to automation scripts. Idempotence dictates that the system converges to a stable state, no matter how many times and from which starting state the automation scripts are executed. Although idempotence is an important requirement for functional correctness, conventional automated solutions generally do not test the idempotence of automation scripts.

Figure 1:
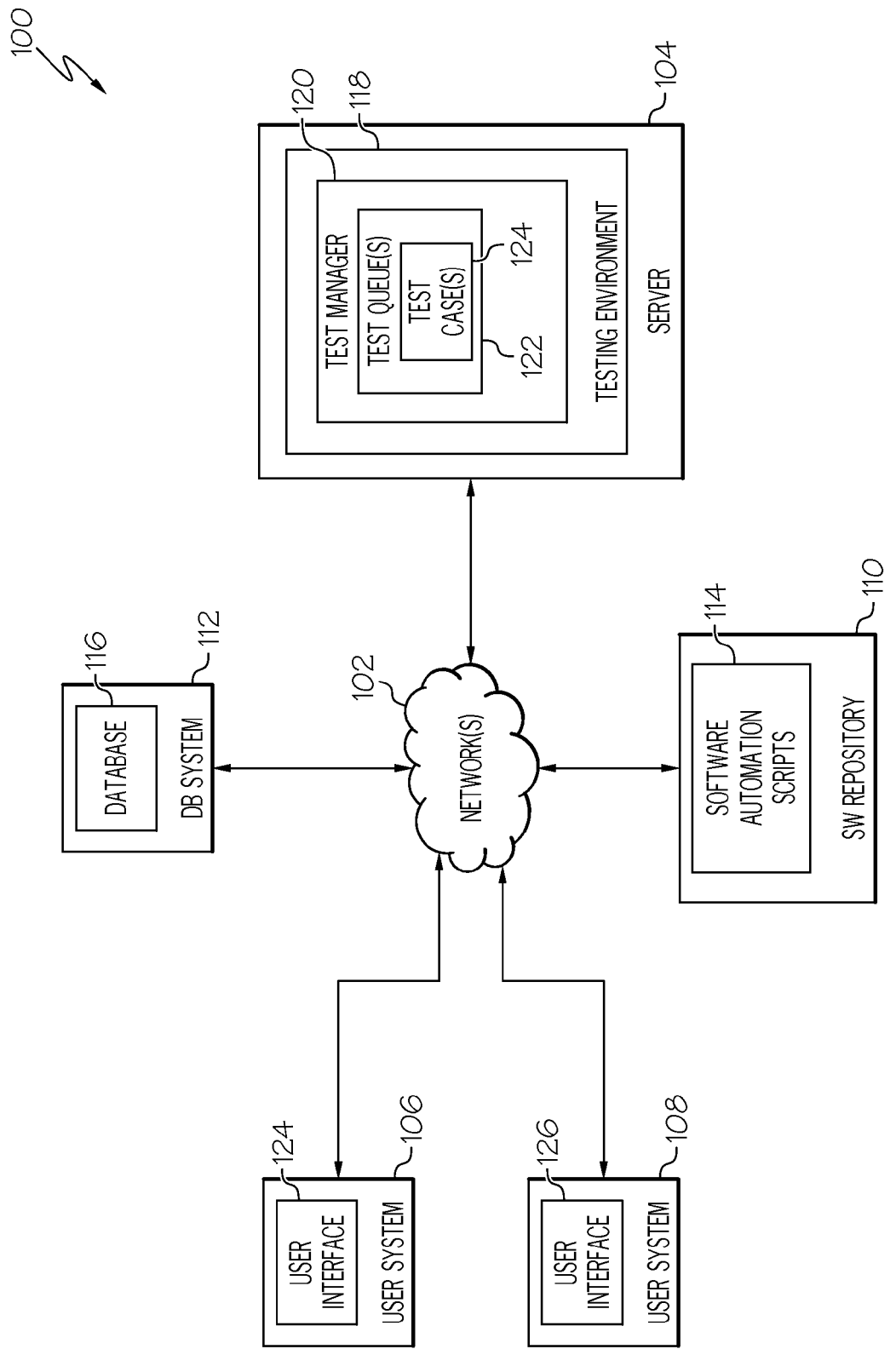
FIG. 1 is a block diagram illustrating one example of an operating environment according to one embodiment of the present invention.

Therefore, one or more embodiments provide an operating environment 100, as shown in FIG. 1, for systematically testing of functional correctness and idempotence of automation scripts such as, but not limited to, IaC automation code. The operating environment of FIG. 1 can be a cloud computing environment or a non-cloud computing environment. In a cloud computing environment, various embodiments of the present invention discussed below are provided as a service. FIG. 1 shows one or more networks 102 that, in one embodiment, can include wide area networks, local area networks, wireless networks, and/or the like. In one embodiment, the environment 100 includes a plurality of information processing systems 104, 106, 108 that are communicatively coupled to the network(s) 102. The information processing systems 104, 106, 108 include one or more servers 104 and one or more user systems 106, 108. The user systems 106, 108 can include, for example, information processing systems such as desktop computers, laptop computers, tablet-based computers, wireless devices such as mobile phones, personal digital assistants, and the like.

FIG. 1 further shows one or more software repositories 110 and one or more database systems 112 communicatively coupled to the network 102. In one embodiment, software automation scripts 114 are stored within the software repositories 110. However, automation scripts 114 can also be obtained from a user system 106, 108 as well. An automation script 114 (also referred to herein as "automation 114"), in one embodiment, is configured to place a given computing system into a target/desired state. An automation script 114 comprises a sequence of executable tasks. Each of these tasks changes a current state of the computing system, where after the last task is executed the computing system should be in the target state, possibly (but not necessarily) after repeatedly executing the tasks in the automation scripts 114 multiple times.

The database systems 112 comprise one or more databases 116 in which test data is stored. It should be noted that although FIG. 1 shows each of the systems 104, 106, 108 being separate from each other two or more of these systems can be included within a single system as well. Also, the repositories 110, 112 can be included within a single system or one of the server or user systems 104, 106, 108 as well.

The server system 104, in one embodiment, is a testing host comprising a testing environment/module 118 for testing whether an automation script 114 is idempotent and/or convergent. It should be noted that although FIG. 1 only shows a single server 104 multiple servers can be utilized to perform multiple tests in parallel. An idempotent automation script (and task) is an automation script task that has the same effect i.e., leads to the same post-state of the system regardless of how many times it is executed. In other words, under the assumption that the system is isolated and its state cannot be changed by external effects, an idempotent automation script that is executed several times in a row may perform state changes only upon its first execution, and all subsequent executions have no effect.

A converging automation script (and task) is able to reach a certain state under any condition, i.e., starting from any valid start state, given its required input parameter values. For instance, consider an automation script that installs a Web server which requires a kernel module to be loaded. Depending on the operating system version the module is either M1 (if operating system is O1) or M2 (if operating system is O2). Hence, the possible post-states of the script are PS1={"M1 loaded", "Web server started"} and PS2={"M2 loaded", "Web server started"}. The automation script converges to the state {"Web server started"}, which is the biggest common subset (intersection) of PS1 and PS2.

The testing environment 118 comprises a test manager 120 that manages the systematic testing of functional correctness and idempotence of automation scripts 114. The test manager 120 comprises one or more test queues 122, each comprising test cases 123 for one or more automation scripts 114. In one embodiment the test cases 123 for a given automation script 114 are executed in parallel. A test case 123, in one embodiment, is a separate executable instance of the automation script 114 configured based on one or more different configurations (e.g., states) of the computing system associated with the script 114. A test case 123 comprises one or more of the following configurations: (1) initial state and configuration (e.g., operating system, pre-installed packages, etc.) of the test container 208 that executes the automation script 114; (2) input parameter assignment 405 (FIG. 4) for all or a subset of the parameters 403 (FIG. 4) associated with the automation script 114; and (3) configuration of the actual order and sequence of tasks to be executed within this test case 123, not necessarily fully corresponding to the order and sequence defined by the automation 114, but possibly skipping or repeating certain tasks or task subsequences. For example, one test case may execute the automation script 114 with set of state properties defining a first initial state of the computing system, while another test case may execute the automation script 114 with a different set of state properties defining a second initial state of the computing system.

The testing process performed by the testing environment 118 systematically assesses the functional correctness and idempotence of automation scripts 114. The functional correctness of the automation scripts 114 are tested with respect to a specification of the desired behavior, while achieving a certain level of confidence of the assessment based on how exhaustively the scripts have been tested (referred to herein as "test coverage"). Test cases 123 for the automation scripts 114, which are a plurality of different variations of the scripts 114, are generated and executed. The outcome of the execution (with respect to the resulting system state) is analyzed and matched against the expected result.

Each of the user systems 106, 108, in one embodiment, comprises a user interface (UI) 124, 126 that allows the user (tester) to interact with the server system 104. In one embodiment, the user interface 124, 126 displays system model information associated with an automation script 114 and test results in a structured way. All automations and tasks plus their parameters are displayed in the UI 124, 126, and for each task the user can inspect the details of all historic task executions. In addition to displaying data to the user, the UI 124, 126 is also used to request test execution from the test manager 120. For example, to start a new test suite (i.e., set of test cases 123 with specific configurations) the user specifies the desired level of coverage in terms of STG-based coverage goals. The user can optionally specify coverage for various testing phases (e.g., learning, combination, and repetition) discussed in greater below. Moreover, the user is able to specify the set of test values (parameter assignments 405) for each automation parameter 403. When all configurations are set the UI 124 contacts the test manager 120 on one or multiple test hosts 104 and requests the generation and execution. The test execution is parallelized over multiple testing hosts 104. Therefore, each test manager 120 is aware of the subset of test cases 123 it is responsible for.

Figure 2:
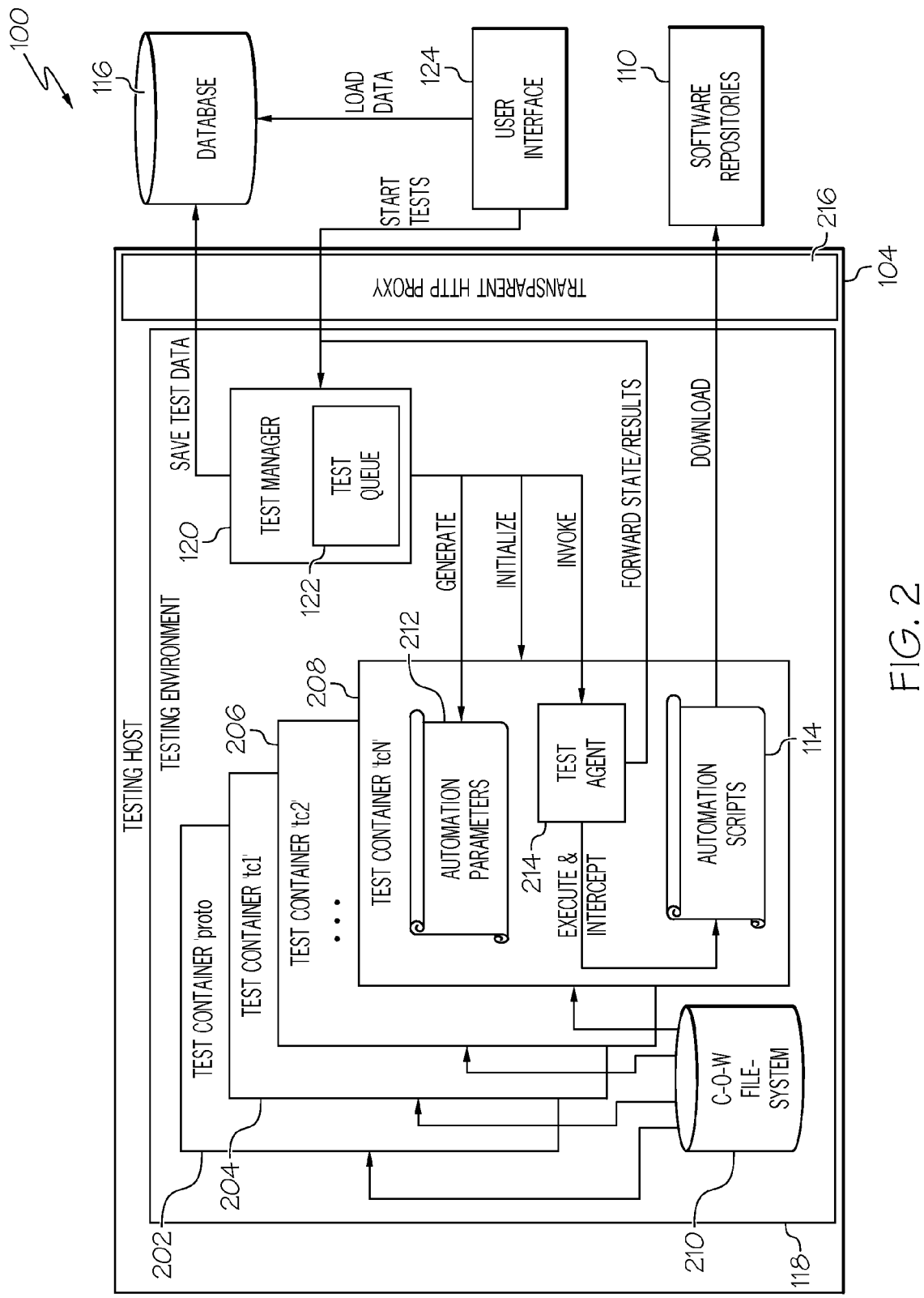
FIG. 2 illustrates a more detailed view of a testing host within the operating environment of FIG. 1 according to one embodiment of the present invention.

FIG. 2 shows a more detailed view of the server 104. As discussed above, a user (tester) utilizes the user interface 124 of the user system 106 to interact with the testing environment 118 of the server 104. For example, the user is able to initiate the testing of an automation script 114 by sending a request to the testing host 104 via the user interface 124. The test manager 120 orchestrates the execution of an automation script test and generates the tests cases 123 for the test. In one embodiment, the test manager 120 creates a test container 202, 204, 206, 208 (also referred to herein as a "lightweight container", "container", "virtual machine", or "virtual machine container") for each test case execution request. In other words, each test case 123 is executed in a corresponding test container 202, 204, 206, 208 as compared to a separate physical machine or virtual machine. One advantage of utilizing a container 202 is that a container can generally be provisioned faster than a virtual machine. A test container 202 executing a given test case 123 is isolated from the test containers 204, 206, 208 executing the other test cases 123, so as not to interfere with the system state and state changes resulting from the execution of any other test case 123. However, physical machines can also be utilized to execute test cases 123. Each test container 202, 204, 206, 208 comprises its own processing space and network space. The pool of containers 202, 204, 206, 208 comprises one or more prototype containers 202, which are initialized once and used as a template for quickly spawning new test containers 204, 206, 208 with identical configurations. Prototype containers 202 provide a clean operating environment for each test case. Each prototype includes a base operating system and some basic services such as, but not limited to, a secure shell (SSH) daemon.

In one embodiment, each test container 202, 204, 206, 208 is associated with a dedicated root directory within a file system 210 of the testing host 104. For example, instead of duplicating the entire files system 210 for each prototype container, a copy-on-write (C-O-W) files system can be shared among the containers 202, 204, 206, 208. This allows new instances of the file system 210 to be spawned efficiently within a few seconds. It should be noted that embodiments of the present invention are not limited to a copy-on-write file system.

The test manager 120 initializes the containers 202, 204, 206, 208 and also generates automation attributes/parameters 212 for each test case 123. Automation attributes 212 comprise parameter assignments 405 that determine how the automation scripts 114 reach the final system state, and which concrete state properties 416 the desired system state be comprised of. For example, consider an automation script 114 that installs a program to a certain directory. Assume that the target directory can be defined using a parameter 403 denoted "bin_dir" that can be either "/bin" (default value) or "/usr/bin" (valid and default values are defined by the constraints 409 of this parameter). The test manager 120 generates one or multiple test cases 123 whose automation attributes 212 represent different assignments 405 of the "bin_dir" parameter. In case an automation script 114 defines multiple parameters 403, the test manager 120 generates a plurality of test cases 123 with combinations of the parameter assignments 405.

A test agent 214 is instantiated in each test container 202, 204, 206, 208 for interaction with the test manager 120. The test manager 120 instructs the test agent 214 to execute a given test case 123 (e.g., the automation scripts 114 with a given set of automation attributes 210). The test agent 214 enforces the actual order and sequence of tasks to be executed within a test case 123, and can repeat or skip certain tasks or task subsequences, as discussed below. During execution of a test case 123 the test agent 214 intercepts the automation scripts 114 to take a system state snapshot before (pre-state) and after (post-state) each execution of a task. The state data as well as the result of the automation run (e.g., return codes, console output, etc.) are forwarded to the test manager 120, which filters and aggregates the data (i.e., test data) before storing it to the database 116.

It should be noted that in some instances automation scripts download files and software packages (such as ZIP files, binaries, or script files) from external servers. To provide high performance and lowest possible resource consumption, one or more embodiments cache these files locally. In one embodiment, a transparent Hypertext Transfer Protocol (HTTP) proxy 216 is installed on the testing host 104, which intercepts outgoing network traffic and temporarily stores files retrieved from the network to the local hard disk. However, other proxies based on other protocols are applicable as well. The test containers 202, 204, 206, 208 are configured to automatically redirect all outgoing HTTP requests to the proxy server 216, which, if available, restores the data from the local hard disk or requests the data over the network, and then returns the data to the test container.

Figure 3:
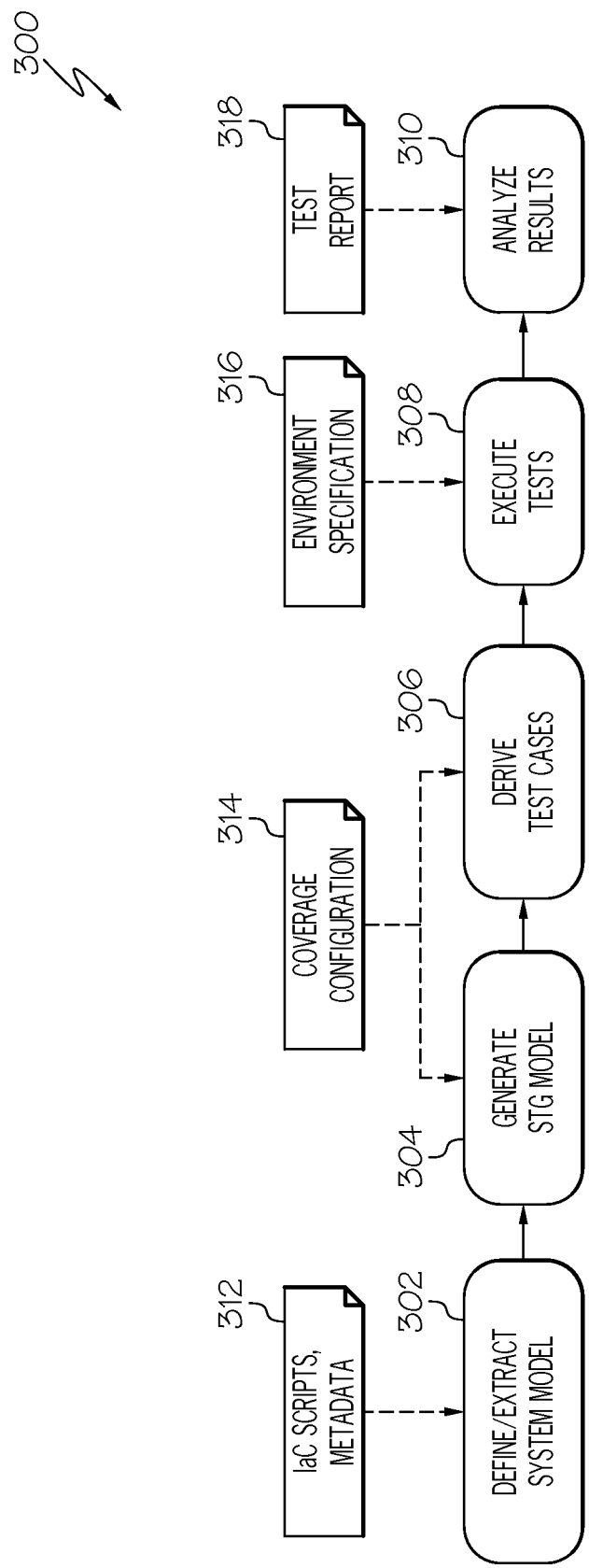
FIG. 3 illustrates an overview of a process for automatically testing idempotence and convergence of a software automation script according to one embodiment of the present invention.

FIG. 3 shows an overview of the automation script testing process 300 performed by the testing environment 118 according to one embodiment. In this embodiment, the testing environment 118 and its components utilize a model-based testing approach outlined in FIG. 3. FIG. 3 shows that the testing process 300 comprises a plurality of main steps/components 302, 304, 306, 308, 310 with different input and output artifacts 312, 314, 316, 318. In one embodiment, the process 300 is divided into a plurality of parts/phases such as (but not limited to) a learning phase where a system model including a state transition graph is constructed; a combination phase where incompatible tasks are identified; and a repetition phase where the automation script is tested for idempotence and convergence. For each of the phases, the automation script 114 under test is executed with different configurations. Each of these phases is discussed in greater detail below.

During the learning phase a system model of the automation script under test and the environment in which the script operates is determined/constructed. This reduces the need for manual specification of the automation script. This system model includes the involved tasks, parameters, system states, desired state changes, etc. Second, a state transition graph (STG) model that can be directly derived from the system model is constructed/extracted.

Figure 4:
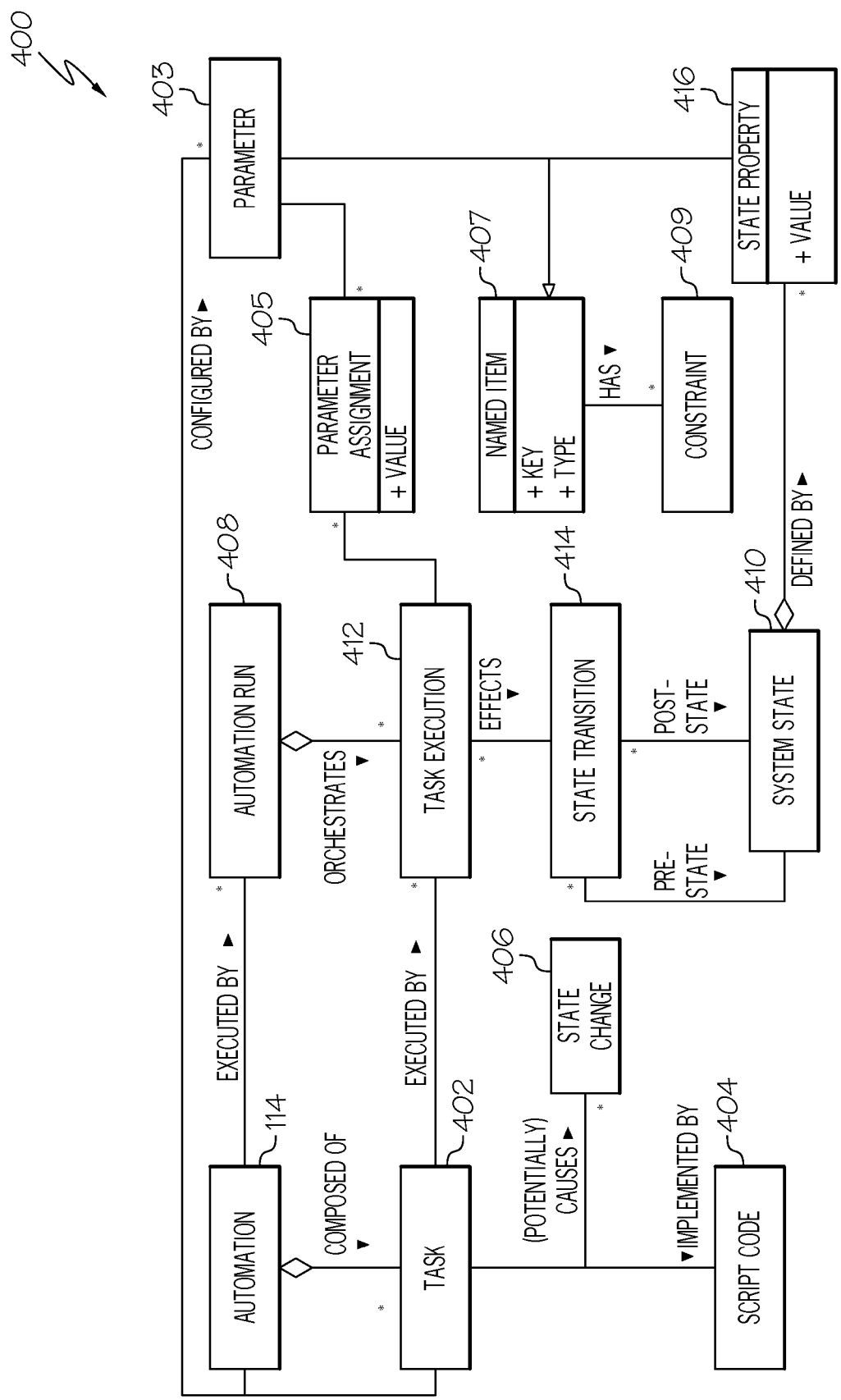
FIG. 4 illustrates one example of a system model for a software automations script according to one embodiment of the present invention.

In one embodiment, the input 312 to the "Define/Extract System Model" process 302 includes the automation scripts 114 (e.g., IaC scripts) and additional metadata. As will be discussed in greater detail below, the scripts 114 are parsed to obtain a model of the automation script 114 and the environment it operates in. This model is herein referred to as the "system model". IaC frameworks such as Chef with its declarative resource types allow for the automatic extraction of a large portion of the required data from the script code 404 (FIG. 4), and additional metadata can be provided by the user to complete the system model. Additional metadata provide all necessary information that facilitates efficient testing of the automation 114, but is not directly encoded in or extractable from the automation script code 404. Non-limiting examples of additional metadata are constraints 409 (FIG. 4) and domain ranges for parameters 403 or the potential/expected state changes 406 (FIG. 4) resulting from execution of an automation task 402 (FIG. 4). Also, automation parameters may have the type "string", but the accepted values for that particular automation script are only three possible strings values. Having this additional metadata allows an even better/more precise generation of test cases 123.

Given the sequence of tasks in the automation script 114 and their expected state transitions, the "Generate STG model" process 304 constructs a State Transition Graph (STG), which models the possible state transitions that result from executing the automation in different configurations 314 and starting from arbitrary initial states. The "Derive Test Cases" process 306 derives test case specifications from the generated STG taking into account user-defined coverage criteria 314. The test cases are then materialized and executed in the real system (i.e., test containers 202, 204, 206, 208 configured with the environment specification 316) by the "Execute Tests" process 308. During test execution, the system being simulated within the test container 202 is monitored for state changes by intercepting the execution of the automation tasks. The "Analyze Results" process 310 performs a test analysis on the collected data, which identifies idempotence and convergence issues based on well-defined criteria, and generates a detailed test report 318. Each of the above processes is discussed in greater detail below.

As discussed above, the testing environment 118 obtains an automation script 114 and generates a system model that represents the script 114 and the environment it operates in. FIG. 4 shows a high-level overview a system model 400 for an automation script 114. In this example, the system model 400 is depicted as an UML (Unified Modeling Language) class diagram. An automation script 114 is composed of multiple tasks 402 that represent the atomic building blocks of the automation. Tasks 402 are implemented by fragments of script code 404 and are configured by one or more parameters 403. Each parameter 403 has a parameter assignment 405 with a value during an execution 412 of the task 403. The parameter 403 is represented as a named item 407 with a key value and a type value. Each named item optionally has one or more constraints 409 that define the data type and valid values of this item (e.g., possible values for a parameter "bin_dir" could be "/bin" and "/usr/bin", as in the example discussed above). Constraints 409 are used to validate the values of parameters 403 and state properties 416. Moreover, the use of constraints 409 helps to limit the number of possible parameter assignment values 403 and hence may help to reduce the number of generated test cases 123.

Figure 5:
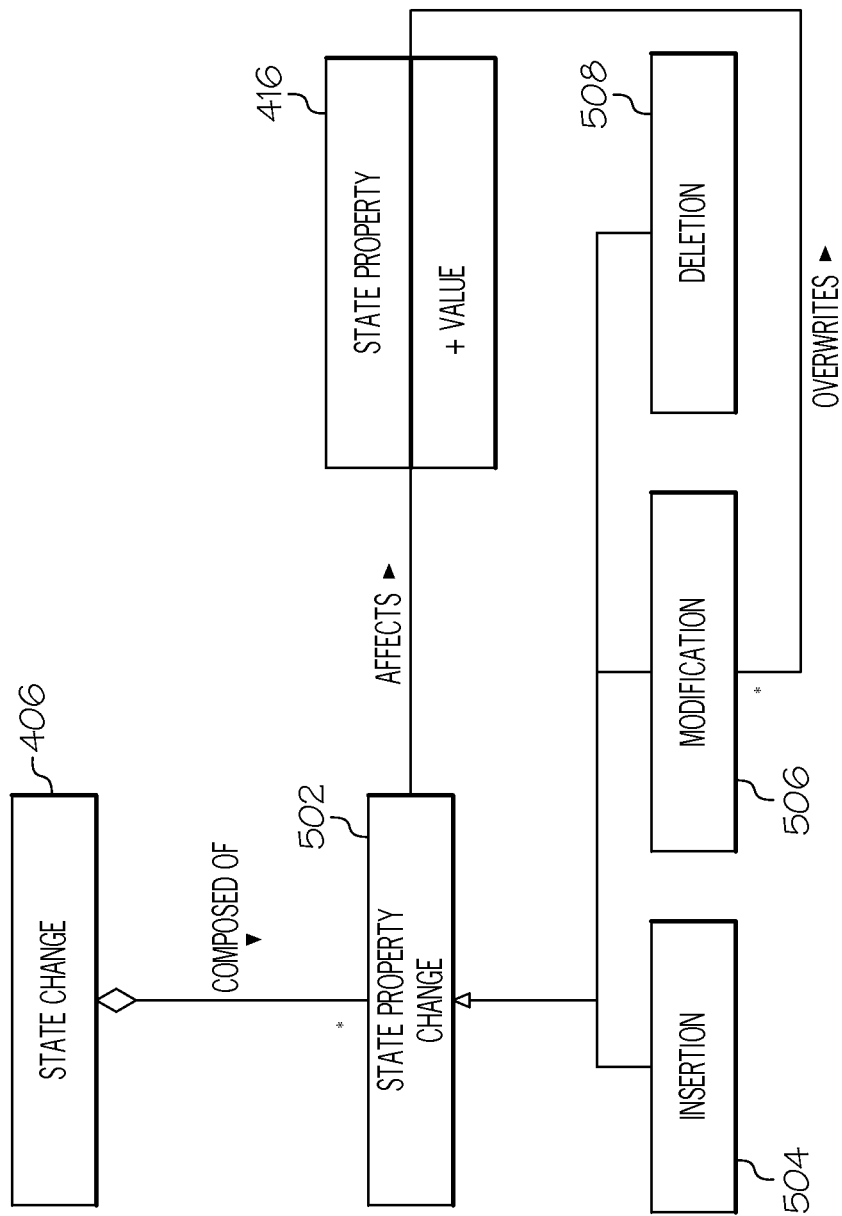
FIG. 5 illustrates one example of a model for system state property changes according to one embodiment of the present invention.

Each task 402 is associated with a set of state changes 406 that the task may potentially cause. A state change 406 comprises an arbitrary number of state property changes 502 (FIG. 5). State property changes 502 are categorized into three sub-types: insertion 504, modification 506, and deletion 508, as shown in FIG. 5. The execution of an automation script 114 is represented by an automation run 408, which itself is composed of a multitude of sequential task executions. The term "potentially" is used for the association between task and state change because, depending on the implementation of the task 402 and the current system state 410, the state changes 406 need not necessarily take place upon each and every execution of the task 402 (e.g., idempotent tasks perform state changes only if they have not been executed before).

Automation runs 408 and the task executions 412 they include have a certain effect on the system state 410, which is captured in the state transition entity 414. The state transition 414 is inferred from two "snapshots" of the system state 410. The pre-state is recorded before execution of the task/automation, and the post-state is recorded after execution of the task/automation. For example, if a task creates a directory "/tmp/app", then the potential state change is defined by a pre-state property "/tmp/app does not exist" and a post-state property "directory/tmp/app exists". The properties are expressed in words for illustration here, although in the system model the properties are encoded as key-value pairs, e.g., ("/tmp/app", NULL) in the pre-state and ("/tmp/app",{("type", "directory"),("size", "4 KB")}) in the post-state.

Each state 410 is defined by a set of state properties 416, represented as key/value pairs. For example, using the directory example above the contents of the parent directory "/tmp/" before and after task execution can be represented as key/value pairs to capture the system state. Similarly, if information is available that the task starts a service such as a Web server, it is sufficient to capture the state properties that are likely affected by this task: the open network ports, the list of running processes, the list of system services, plus any additional properties that might be relevant. Note that, as opposed to the potential state changes associated with a task 402, the state transition entity 414 captures the actual change in the system state 410 that really took place after executing a task. This conceptual distinction in the model plays a role for the testing approach, whereas the potential state changes are relevant for test case generation and for determining the set of all possible system states. The actual state transitions are relevant during test case execution and for determining the level of test coverage.

Figure 6:
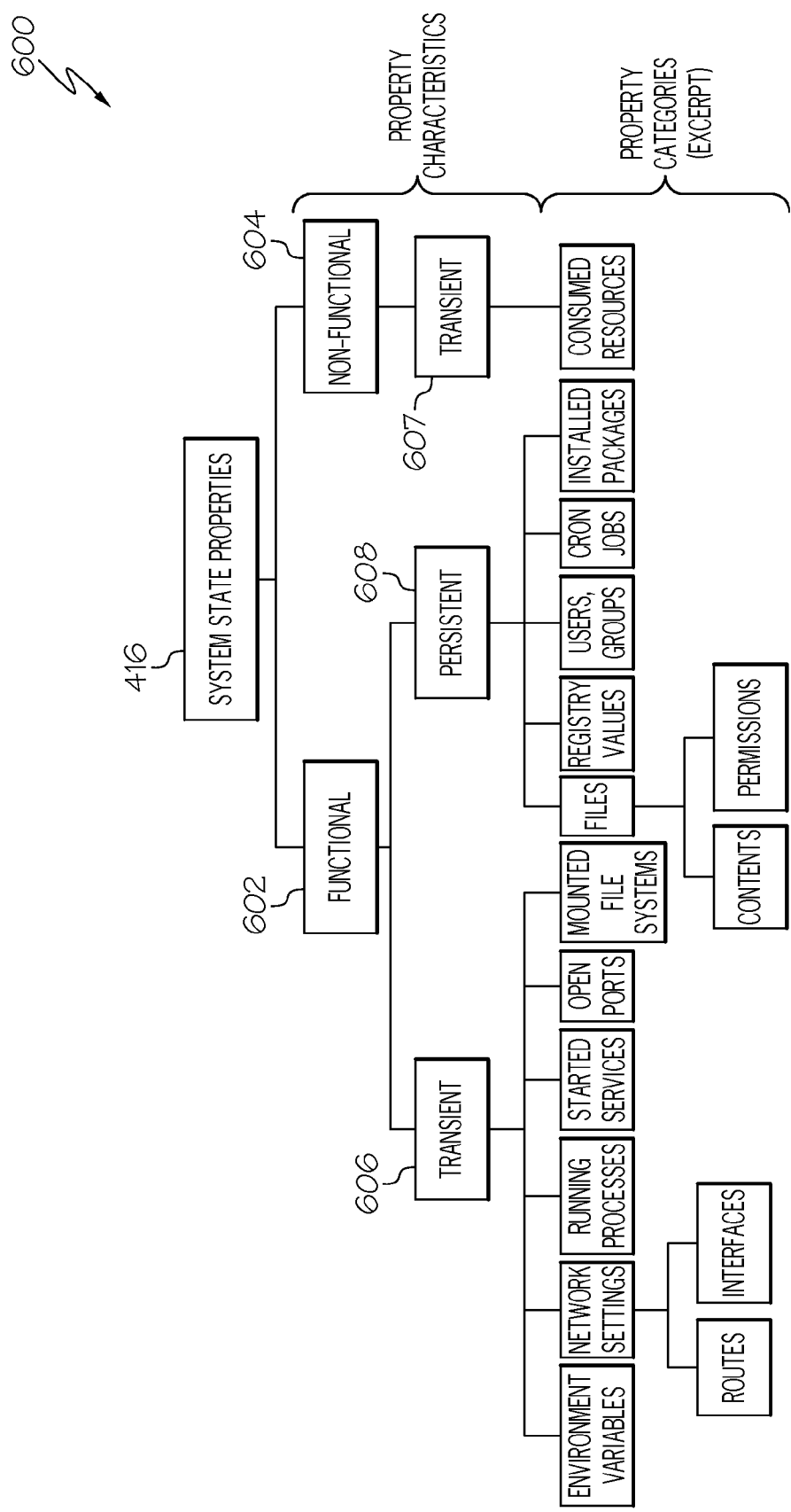
FIG. 6 illustrates one example of a taxonomy for system state properties according to one embodiment of the present invention.

System state properties 416 have different characteristics. These different characteristics are captured in the taxonomy 600 of system state properties as shown in FIG. 6. It should be noted that the taxonomy 600 of FIG. 6 illustrates only an excerpt of the state properties supported by this testing method; any further system state properties not included in FIG. 6 are equally supported by one or more embodiments. The taxonomy 600 distinguishes between functional properties 602 and non-functional properties 604. One important feature to test is the persistence of properties. For example, transient properties 606, 607 are volatile and keep their value only for a limited time or until a certain event happens (for instance, until the next shutdown and reboot of the machine). Persistent properties 608 keep their values unchanged until they are actively modified or deleted. According to this definition, persistent properties 608 require their state to be written to a persistent database or file system, in order to be restored after the machine and its operating system get restarted. Note that functional transient properties 606 can be turned into persistent properties if the system ensures that the values are preserved over time (e.g., using boot scripts and/or periodically running "cron" scripts).

The distinction between transient and permanent state properties plays an important role for automations. For instance, consider the case of a power outage on a machine that is hosting an application server (which was configured using an automation script). After the power supply is restored and the server machine has rebooted, certain state properties need to be automatically restored (e.g., the server listens to a certain network port), whereas other properties are permanently lost or (intentionally) reset (e.g., files deleted from a temporary directory, or current connection pool size reset to 0).

The system model 400 and automation scripts 114 can be formally defined using the notation shown in Table 1 below.

configures a LAMP stack (Linux-Apache-MySQL-PHP) to run a Web application. In this example, the automation defines four tasks such that $A=\{a_1,a_2,a_3,a_4\}$. Table 2 below shows the input parameters consumed by each task. Note that $a_1$ could be a package resource to install MySQL, whereas $a_3$ could be implemented by a script resource

TABLE 2

| # | Task | Parameters |
|---|---|---|
| a1 | Install MySQL | — |
| a2 | Set MySQL password | p2 = root password |
| a3 | Install Apache & PHP | p3 = OS distro |
| a4 | Deploy Application | p4 = app. context path |

A system state $s \in S$ includes a number of system properties, defined as (key, value) pairs. In the current example, assume the state of open ports and OS services installed are being tracked, such that K={open_ports,services}. Also, suppose that, prior to the automation run, the initial system state is given by $s_0=\{(\text{open\_ports},\{22\}),(\text{services},\{\text{ssh,acpid}\})\}$, i.e., port 22 is open and two OS services (ssh and acpid) are running. After task $a_1$'s execution, the system transitions to a new state $s_1=\{(\text{open\_ports},\{22,3306\}),(\text{services},\{\text{ssh, acpid, mysql}\})\}$, i.e., task $a_1$ installs the mysql service, which is then started and opens port 3306.

In the above example, the following pieces of state are tracked: network routes, OS services, open ports, mounted file systems, file contents, and permissions, OS users and groups, cron jobs, installed packages, and consumed resources. However, other states can be tracked as well. In one embodiment, the expected state transition (expressed via function t) and the actual state change (function c) that took

TABLE 1

| Symbol | Description |
|---|---|
| K, V | Set of all possible state property keys (K) and values (V). |
| d: K → $\mathcal{P}$(V) | Domain of possible values for a given state property key. |
| P := K × V | Possible property assignments. $\forall (k, v) \in P: k \in K, v \in d(k)$ |
| S ⊆ [K → V] | Set of possible system states. The state is defined by (a subset of) the state properties and their values. |
| A = {$a_1, a_2, \ldots, a_n$} | Set of tasks (or activities) the automation consists of. |
| D ⊆ $\mathcal{P}$(A × A) | Task dependency relationship: task $a_1$ must be executed before task $a_2$ iff $(a_1, a_2) \in D$. |
| R = [$r_1, r_2, \ldots, r_m$] | Set of all historical automation runs. |
| E = {$e_1, e_2, \ldots, e_l$} | Set of all historical task executions. |
| r: E → R | Maps task executions to automation runs. |
| e: (A∪R) → E∪ | Returns the list of task executions for a task or an automation run. |
| o: E → {success, error} | Returns whether a task execution yielded a success output or not. |
| succ, pred: A → A∪∅ | Get the successor or predecessor of a task within an automation run. |
| st, ft: (E∪R) → $\mathbb{N}$ | Returns the start time (st) and finish time (ft), e.g., as Unix timestamp. |
| t: (S × A) → S | Expected state transition of each task. Pre-state maps to post-state. |
| c: E$_\mathbb{N}$∪ → [S → S] | History of actual state changes effected by a list of task executions. |
| pre, post: A → $\mathcal{P}$(S) | Return all potential (for a task) or concrete (for a task execution) pre-states (pre) and post-states (post). |
| pre, post: E → S | |

In particular, an automation script 114 comprises multiple tasks (or steps) (A), with dependencies (D) between them. In one embodiment, a total ordering of the tasks is assumed, i.e., $\forall a_1, a_2 \in A:(a_1 \neq a_2) \Leftrightarrow ((a_1,a_2) \in D) \oplus ((a_2,a_1) \in D)$. An automation is executed in one or multiple automation runs (R), which in turn include a multitude of task executions (E). For example, consider the automation script 114 that installs and place after executing a task are distinguished. This distinction is important as the expected state transitions are used to build a state transition graph, whereas the actual state changes are monitored at runtime and used for test result analysis.

A task $a \in A$ is idempotent with respect to an equivalence relation ≈ and a sequence operator ∘ if repeating a has the same effect as executing it once, $a \circ a \approx a$. The following defines the conditions under which a task is considered idempotent based on the evidence provided by historical task executions as applied to the system model discussed above. As the basis for this definition, the notion of non-conflicting system states is introduced. A state property assignment $(k,v_2) \in P$ is non-conflicting with another assignment $(k,v_1) \in P$, denoted nonConf$((k,v_1),(k,v_2))$, if either $v_1=v_2$ or $v_1$ indicates a state that eventually leads to state $v_2$. That is, non-conflicting state is used to express state properties that are currently in transition. As an example, consider that k denotes the status of the Apache Web server. Clearly, for two state values $v_1=v_2=$"running", $(k,v_2)$ is non-conflicting with $(k,v_1)$. If $v_1$ indicates that the server is currently starting up ($v_1=$"booting"), then $(k,v_2)$ is also non-conflicting with $(k,v_1)$. The notion of non-conflicting state properties accounts for long-running automations that are repeatedly executed until the target state is eventually reached. Note that the nonConf relation is in general neither reflexive nor transitive (counter-examples can be easily constructed, e.g., for the Apache example). In general, domain-specific knowledge is can be utilized to define concrete non-conflicting properties. In one embodiment, state properties are considered non-conflicting if they are equal. Moreover, if a wildcard symbol (*) is used to denote that the value of k is unknown, then $(k,v_x)$ can also be considered non-conflicting with $(k,*)$ for any $v_x \in V$.

A state $s_2 \in S$ is non-conflicting with some other state $s_1 \in S$ if $\forall (k_1,v_1) \in s_1, (k_2,v_2) \in s_2 : (k_1=k_2) \Rightarrow \text{nonConf}((k_1,v_1),(k_2,v_2))$. In other words, non-conflicting states require that all state properties in one state be non-conflicting with equivalent state properties in the other state. Based on the notion of non-conflicting states, idempotent tasks can be defined as follows: an automation task $a \in A$ is considered idempotent with respect to its historical executions $e(a)=\langle e_1, e_2, \ldots, e_n \rangle$ iff for each two executions $e_x, e_y, \delta e(a)$ the following holds: $(ft(e_x) \leq st(e_y) \wedge o(e_x)=\text{success}) \Rightarrow (o(e_y)=\text{success} \wedge \text{nonConf}(\text{post}(e_y),\text{post}(e_x)))$. In other words, as soon as a task execution $e_x \in e(a)$ succeeds at some point, then all following executions of this task must also succeed and yield a post-state that is non-conflicting with the post-state of $e_x$. Equivalently, idempotence for sequences of tasks (and hence for the automation script 114 as a whole) can be defined as follows: a task sequence $a_{seq}=\langle a_1, a_2, \ldots, a_n \rangle \in A^n$ is considered idempotent if (and only if) for each two sequences of subsequent task executions $e'_{seq}, e''_{seq} \in (e(a_1) \times e(a_2) \times \ldots \times e(a_n))$ the following holds:

$$ft(e'_{seq}[n]) \leq st(e'_{seq}[1]) \Rightarrow \forall i \leq n : (o(e'_{seq}[i]) = \text{success} \Rightarrow$$
$$(o(e''_{seq}[i])=\text{success} \char`\^ \text{nonConf}(\text{post}(e''_{seq}[i]), \text{post}(e'_{seq}[i]))))$$

Note that idempotence, in one or more embodiments, not only considers the post-state of tasks, but also distinguishes between successful and unsuccessful task executions. Also, idempotence in one or more embodiments does not require post-states to be strictly equal, but allows for non-conflicting states.

Figure 7:
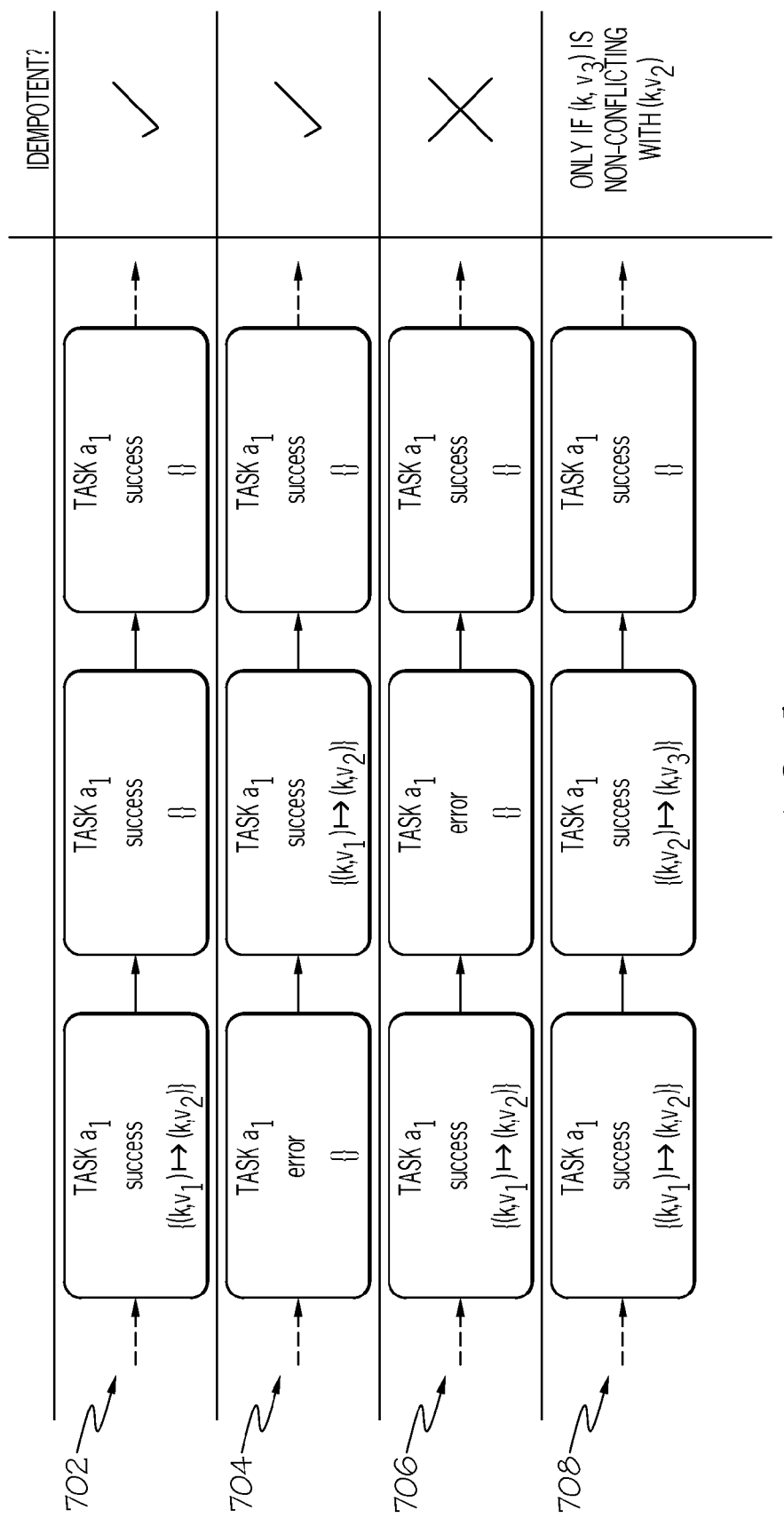
FIG. 7 illustrates one example of idempotence for different task execution patterns according to one embodiment of the present invention.

FIG. 7 illustrates idempotence of four distinct task execution sequences. Each execution is represented by a rounded rectangle that comprises the result and the set of state changes. For simplicity, FIG. 7 is based on a single task $a_1$, but the same principle applies also to task sequences. Sequence_1 702 is idempotent, since all executions are successful and the state change from pre-state $(k,v_1)$ to post-state $(k,v_2)$ only happens for the first execution. Sequence_2 704 is idempotent, even though it includes an unsuccessful execution in the beginning. This is an important case that accounts for repeatedly executed automations which initially fail until a certain requirement is fulfilled (e.g., Apache server waits until MySQL has been configured on another host). Sequence_3 706 is non-idempotent (even though no state changes take place after the first execution), because an execution with error follows a successful one. In Sequence_4 708 idempotence depends on whether $(k,v_3)$ represents a state property value that is non-conflicting with $(k,v_2)$. If so, $a_1$ is considered idempotent, otherwise not.

The convergent state of a task $a \in A$ is a state $s_{conv} \in S$ for which holds that $s_{conv}$ is non-conflicting with the post-states of all historical executions of a: $\forall e_x \in e(a), s_{post} \in \text{post}(e_x) : \text{nonConf}(s_{post},s_{conv})$. Task a, based on the evidence provided by the historical executions, converges to the state $s_{conv}$. Starting from the current state of a system after executing a task $a \in A$, the testing environment 118 goes back in the history of executions and determine the biggest common subset of non-conflicting state properties, with respect to the post-state of executions. The convergent state, in one embodiment, is a subset of the final post-state after the last execution. However, in other embodiments, the convergent state is the entire final post-state.

As discussed above, the concept of "state" in the system model denotes a collection of state property values. The state representations, in one embodiment, utilized by the testing environment 118 are a subset of the actual system state. Stated differently, the testing environment 118 determines the largest convergent state, i.e., the convergent state with the largest expansion in terms of properties. This allows the testing environment 118 to identify a feasible convergent state. However, other embodiments identify a convergent state based on the actual system state in its entirety.

Regarding convergence for task sequences (and hence for the automation script 114 as a whole), a union relation ($\cup_S$) notation is utilized for state sequences, which is the union of the states where latter states overwrite the property values of former states. For example, the convergent state of a task sequence $a_{seq}=\langle a_1, a_2, \ldots, a_n \rangle \in A^n$ is a state $s_{conv} \in S$ for which holds that $s_{conv}$ is non-conflicting with the post-states union of all executions of $a_{seq}$:

$$\forall e_{seq} \in (e(a_1) \times e(a_2) \times \ldots \times e(a_n)),$$
$$s_{seq} = \langle \text{post}(e_{seq}[1]), \text{post}(e_{seq}[2]), \ldots,$$
$$\text{post}(e_{seq}[n]) \rangle : \text{nonConf}(\cup_S(s_{seq}), s_{conv}).$$

The state convergence of an automation depends on the convergence of its tasks. The exact notion and understanding of the convergent state allows the testing environment 118 to determine whether the automation converges as expected. The number of repeated executions of the automation and the concrete post-states of each execution each has an influence on the convergent state. If the system converges to the target state after, say, x executions, any further executions should have no influence on the state. The testing goal for convergence is therefore two-fold: 1.) testing whether the automation converges to a solid state, and 2.) identifying the number of iterations required to reach the state (possibly under different configurations). Since x is unknown for the general case, an upper bound, in one embodiment, is set for the number of repetitions of each task.

Figure 8:
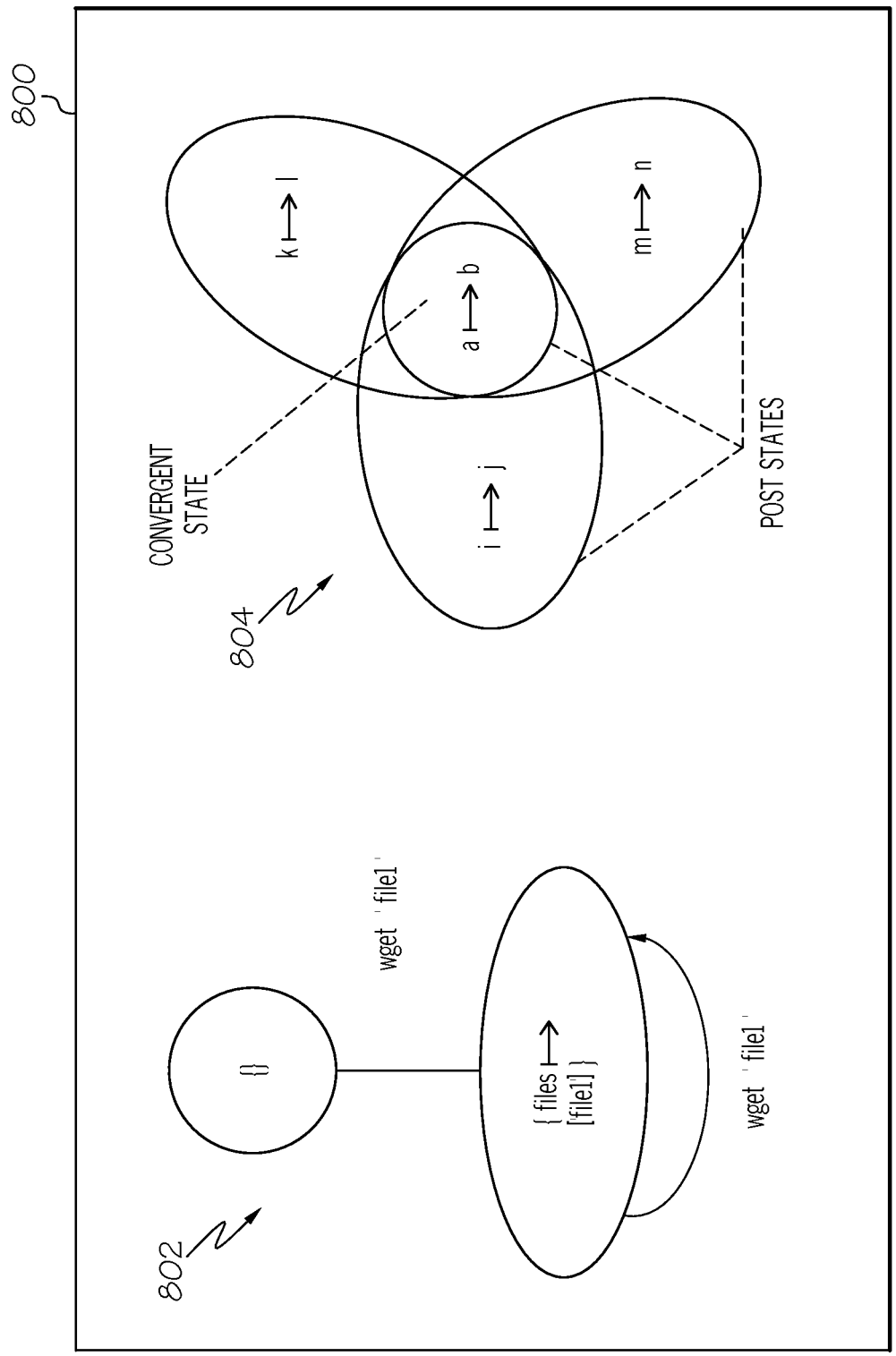
FIG. 8 is a graphic illustration of idempotence and convergence according to one embodiment of the present invention.

FIG. 8 shows a graphic summarization 800 of the meaning of idempotence and convergence. In particular, FIG. 8 shows an idempotent task 802 that downloads a file. This task 802 could achieve idempotence in different ways. For example, each time the task 802 is re-executed, the task 802 can detect whether or not the file needs to be re-downloaded based on its timestamp. Possible state changes are: the file is created; no state changes (file is up-to-date); or the file is updated. Note that creating the file and updating it are non-conflicting. FIG. 8 also shows an automation 804 that is converging. Consider that tasks 1, 2, and 3 are executed in this order. They all append a line to a file named "foo'" (a→b), and make other state changes that are either irrelevant or not tracked, respectively, i→j, k→l, and m→n. Therefore, the system converged to the state where the file "foo" includes all three appended lines.

The following is a more detailed discussion on constructing the system model 400 for an automation script as part of the learning phase of the idempotence/convergence testing process. The core model entities such as automation 114, tasks 402, and parameters 403 can be automatically parsed from the source code of the automation script 114. An automation script 114, in one embodiment, is identified by a name, which can either be chosen automatically (e.g., name of the root folder in which the automation scripts reside), or the user can choose a name using the UI 124. Depending on the used technology and script programming language tasks are demarcated differently in the source code. For example, each task 402 may be defined in its own source code file, in a separate code function, in a code module, etc. Therefore, various methods can be used to extract tasks 402 depending on the script language utilized by the automation script 114. Similarly, parsing of automation parameters 403 and their default values is specific to the script language. One example of an applicable parsing includes extracting this information from the source code based on string matching and regular expressions. Another parsing method includes executing the script containing the parameters 403 and values in a sandboxed environment, allowing direct access to the parameter variables and their default values. However, other parsing methods are applicable as well.

The testing environment 118 is also able to determine which automation parameters 403 are used by which task 402. For example, the testing environment 118 can utilize string matching and regular expressions to check which variables are accessed in the source code of the task 402. Also, the task's source code can be parsed by the testing environment 118 to leverage reflection mechanisms (e.g., if the task 402 is implemented as a code function, use code reflection to determine the name, type and default value of the function's parameters). It should be noted that other methods for identifying the automation parameters 403 are applicable as well.

Dynamic information of the automation script 114 such as (but not limited to) potential system states 410, the transition 414 between the states, and parameter assignments 405 can be determined in various ways. For example, the state transitions 414 can be manually defined and attached as metadata to the definition of the automation tasks 402. State transitions 414 can be attached as machine-readable annotations directly in the script code which implements a task 402. Also, under certain conditions the source code that implements a task 402 can be transformed into a model with well-defined semantics, which allows the testing environment 118 to infer the effects that the execution of this code is going to have. For example, some automation frameworks use domain-specific languages (DSLs) to describe automation logic. If the source code of these DSL commands is parsed and analyzed the different language constructs of the DSL are associated with well-defined semantics about the effect that they achieve.

When parsing a task's source code implementation to determine which state properties 416 are likely going to be changed by the task 402 string matching can be utilized to search for code patterns. For example, if the script code is matched against the pattern "mkdir.*" (mkdir is the Unix command for creating a directory) and includes this string the testing environment 118 determines that a directory will be created. As another example, if the script includes the pattern "/etc/init.d/.*start" (command pattern for starting services on most Unix machines), the system snapshots include at least the list of running services plus other relevant attributes such as open network ports, the list of running processes, etc. It should be noted that other code analysis methods are applicable as well.

In addition, the state transitions 414 along with parameter assignments 405 can be determined automatically by executing the task 402 in a test container 202, taking snapshots of the system state before and after execution, and comparing the two states. This allows dynamic information such as state transitions 414 and parameter assignment 405 to be capture in is runtime environment. The testing environment 118 hooks into the execution of the automation script 114 and intercepts each task execution (in order to take pre-state and post-state system snapshots). In one embodiment, the testing environment 118 hooks into the task without changing any of the source code. A combination of above methods can also be used to obtain the system model information. This allow some tasks to be analyzed on the source code level, some tasks may be annotated with metadata, and the state transitions for the remaining tasks are determined by test execution and state comparison.

The following illustrates one example of constructing a system model by executing multiple instances of the automation script 114 with varying configurations (e.g., states and automation parameters). In this embodiment, the test agent 214 of the testing environment 118 initializes a separate test container 202, 204, 206, 208 for each instance of the automation script 114. Each instance is then executed within its test container 202 with concrete parameter assignments, and the system state changes for the different instances are observed. In one embodiment, the only required manual input is the concrete values of the automation parameters that should be used for testing. For example, for each automation parameter the tester defines at least one value (default value) and, optionally, a set of additional values that reasonably cover the value domain of the parameter. In one embodiment, only valid values, which are expected to lead to a successful execution of the task, are chosen. However, if invalid values are chosen, the tester indicates that these values are expected to break the automation (which is later verified against the test results). In another embodiment, the test input parameters are automatically generated. The test manager 120 generates separates instances of the automation script 114 such that for all input parameters PARAMS(t) of any automation task t, at least one instance exists for each possible value combination of PARAMS(t) where possible values are defined by the tester and/or automatically determined by the testing environment 118. Note that this criterion ensures that all parameter values be tested for each separate task, but it does not require testing of all combinations of input parameters across tasks.

During the execution of each instance the testing environment 118 takes system state snapshots before (pre-state) and after (post-state) each task execution. The state change is computed by comparing the pre-state and the post-state. Additionally, the testing environment 118 tests whether the state properties set by the automation tasks are transitive or permanent. Therefore, in one embodiment, the operating system of the test container 202 is rebooted after execution of each of automation script instances. Then, after the OS has been rebooted the system state is measured once more. Comparison of the system state before and after the reboot indicates the persistence of state properties. For example, any property whose value is modified after the system reboot is considered transient, whereas state properties whose values remain unchanged after the system restart are considered permanent. The result of this phase is, for each automation script 114 and task, a mapping of different parameter configurations to the state property changes that are effected by each configuration.

Figure 9:
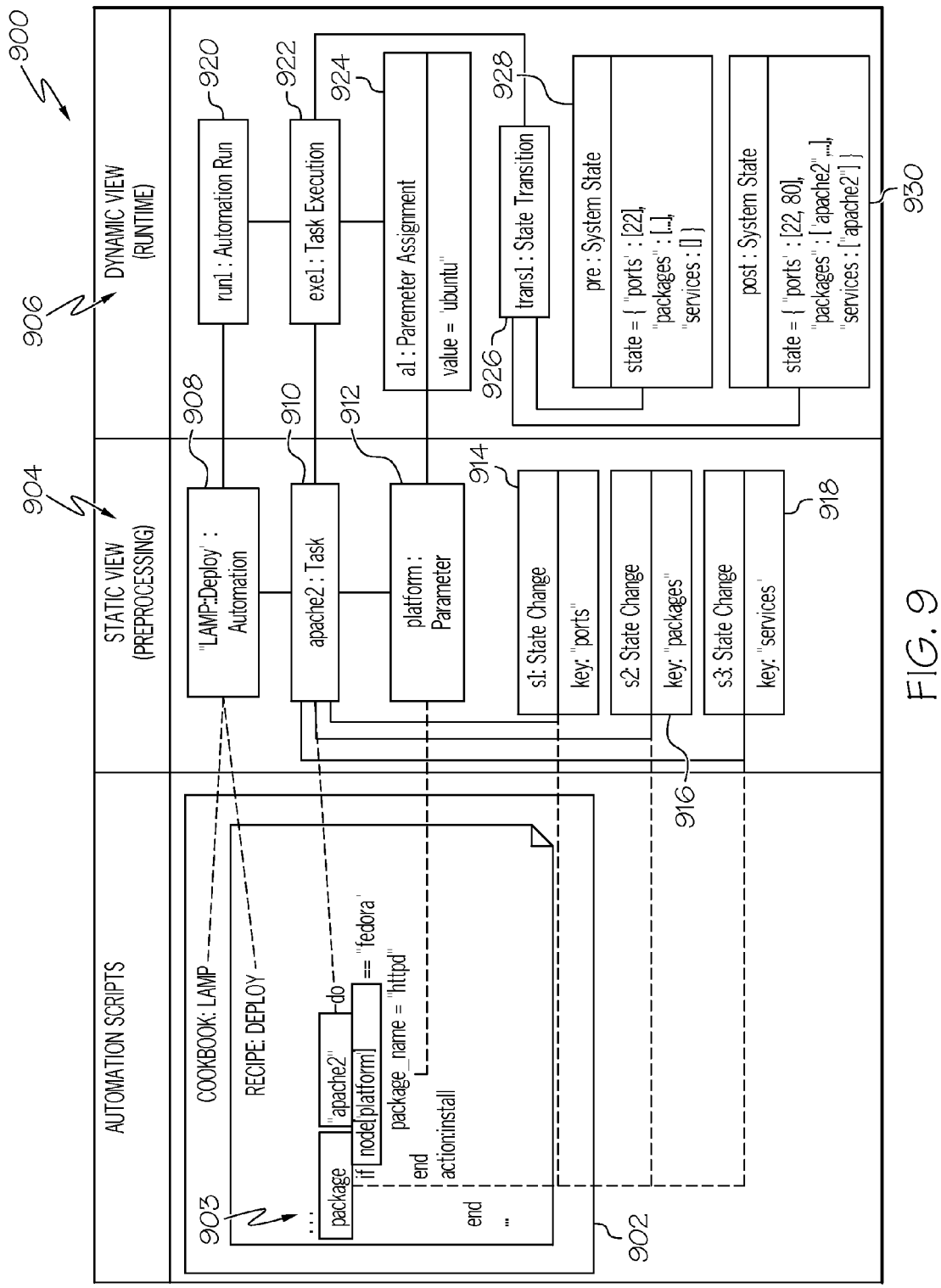
FIG. 9 shows one example of a system model for a software automation script according to one embodiment of the present invention.

FIG. 9 shows one example of a system model 900 generated for an automation script 114. In particular, FIG. 9 shows an automation script 902 that installs and configures a LAMP stack (Linux-Apache-MySQL-PHP) to run a Web application. The model 900 can comprise a static view 904 (preprocessing) and/or a dynamic view 906 (runtime) of the automation script 114. The static view 904 shown in the example of FIG. 9 identifies the automation 908, the tasks 910 of the automation 908, any parameters 912 of the automation 908, and any state changes 914, 916, 918 of the system resulting from the tasks 910. The dynamic view 906 of the model captures dynamic runtime information about each executed task. In the example shown in FIG. 9 the dynamic view 906 identifies a specific run 920 of the script 114, a specific execution 922 of a given task 910, parameter assignments 924 for each parameter 912, and state transition information 926 for each task execution 922 including pre-states 928 and post states 930 of the system.

The information within the system model is utilized by the testing environment 118 to construct/extract an STG for generating test cases. Based on the notation in Table 1 above, an STG=(V, T) is a directed graph where V represents the possible system states and T is the set of edges representing the expected state transitions. The STG is built by iteration over all tasks where nodes are created for each pre-state and post-state of the task. The pre-states and post-states are connected with a transition edge. Because each post-state of a task t' corresponds to a pre-state of a subsequent task t" (if t' has a subsequent task and is not the final task), the two states are merged into a single state node. Each transition edge holds a transition condition, which corresponds to the parameter configuration required for reaching the transition's post-state from its pre-state.

Figure 10:
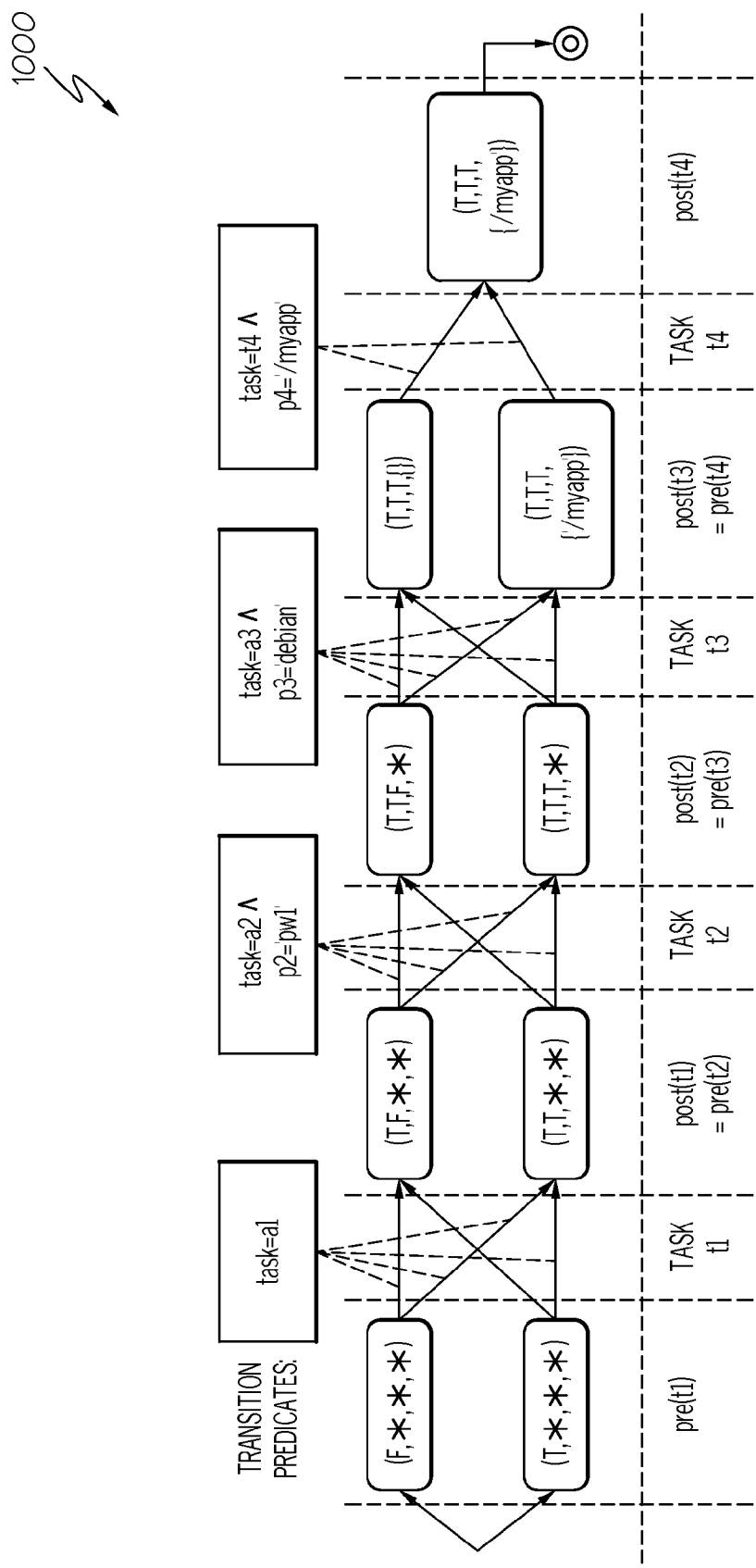
FIG. 10 illustrates one example of a state transition graph according to one embodiment of the present invention.

FIG. 10 shows one example of an STG 1000 that comprises the pre-states and post-states of the four tasks $a_1$, $a_2$, $a_3$, and $a_4$ discussed above. For illustration, four properties are encoded in each state: my (MySQL installed?), pw (password configured?), php (Apache and PHP installed?), and app (set of applications deployed in the Apache Web server. The parameter test values in this example are p2∈{'pw1'}, p3∈{'debian'}, and p4∈{'/myapp'}. The possible values of the state properties in this example are my∈{T, F} ... MySQL installed?, pw∈{T, F} ... Password configured?, php∈{T, F} ... Apache/PHP installed?, and app ... Set of deployed applications. The values "T" and "F" are used as abbreviations for "true" and "false", respectively. For simplicity, branches (e.g., based on which operating system is used) are not included in the graph.

A wildcard symbol (*) is utilized as a placeholder for arbitrary values. The wildcard accommodates one or more embodiments where only a subset of the system state at different points of the graph is of interest. In particular, the pre-states of each task comprise all possible value combinations of the properties the task (potentially) changes. For example, the automation should succeed regardless of whether MySQL is already installed or not. Hence, the pre-states of task t1 comprise both values my=F and my=T, as shown in FIG. 10. Note that instead of the wildcard symbol the graph can be expanded to add one state for each possible value.

Once the STG graph has been constructed for the automation script 114 the testing environment 118 optionally performs the combination phase of the testing process discussed above. In this phase the testing environment 119 systematically tests different combinations of automation tasks 402. This phase allows the testing environment 118 to identify tasks 402 and parameter assignments 405 that do not execute successfully in combination and also any problems or implementation bugs. The identified incompatible tasks 402 and parameter assignments 405 are summarized in the final test report 318. Moreover, this information can be utilized to use only valid task/parameter combinations for any further test cases generated for testing idempotence and convergence of the script. For example, consider an automation script 114 that installs a Web server in 3 tasks (t1, t2, t3): install software packages (t1), adapt configuration file (t2), and start server (t3). Further, assume that task t2 writes an incorrect configuration file parameter that cannot be parsed and causes task t3 to fail. In other words, the automation fails if all three tasks are executed and succeeds if only t1 and t3 are executed. Executing a successful test case, which executes only t1 and t3, can be helpful in identifying that task t2 breaks the automation (in combination with task t3).

During the combination phase, the initial STG created during the learning phase is extended with additional states and transitions to cover task combinations. However, including all possible task combinations can increase the size of the STG by adding a large number of nodes. Therefore, four user-definable coverage criteria are defined to limit the size of the STG: skip-N, combine-N, skip-N-successive, and combine-N-successive, where N is any natural number. The skip-N criterion adds execution paths to the STG by skipping any combination of N tasks. Analogously, the combine-N criterion adds execution paths to the STG by skipping all tasks except for any combination of N tasks. The skip-N-successive criterion and combine-N-successive criterion are variations in which the tasks to be skipped or combined, respectively, need to immediately follow one another (i.e., there must be no other tasks between the N tasks). It should be noted that these user-definable coverage criteria are not required to be applied to the STG.

The following illustrates how the four criteria influence the number of states. Consider again the three automation tasks t1, t2, t3 to install a Web server. The full enumeration of all task combinations yields a set of 7 tuples (each tuple represents one task combination): {(t1), (t2), (t3), (t1, t2), (t1, t3), (t2, t3), (t1, t2, t3)}. For N=1, skip-1 is {(t1, t2), (t1, t3), (t2, t3)}, skip-1-successive is also {(t1, t2), (t1, t3), (t2, t3)}. For N=1 combine-1 is {(t1), (t2), (t3)}, and combine-1-successive is also {(t1), (t2), (t3)}. For N=2 skip-2 is {(t1), (t2), (t3)} skip-2-successive is {(t1), (t3)}. For N=2 combine-2 is {(t1, t2), (t1, t3), (t2, t3)}, and combine-2-successive is {($t_1$, t2), (t2, t3)}. For N=3 skip-3 is { }, skip-3-successive is also { }. For N=3 combine-3 is {(t1, t2, t3)}, and combine-3-successive is also {(t1, t2, t3)}. This example illustrates that any of the four criteria create considerably smaller combination sets (maximum of 3 tuples in the example) than full enumeration (7 tuples in the example).

The testing environment 118 utilizes the initial STG or the extended STG (if available) to generate a plurality of test cases 123 for determining whether the automation script is idempotent and/or convergent. As will be discussed in greater detail below, test cases 123 are generated from an STG such that for each test case a separate instance of the automation script is executed with a different configuration than the other test cases. For example, based on the constructed STG (either the initial STG or the extended STG created during the combination phase) the testing environment 118 identifies the various states that the system associated with the automation script 114 can be in. The testing environment 118 also identifies the various state properties 416 associated with these states from the STG and/or system model.

For example, a given state of the system may comprise specific environment variables, network settings, files, registry values, etc. The testing environment 118 generates a test case 123 by selecting any path along the edges of the STG and recording the state transitions (guided by task executions 412 and parameter assignments 405) that are required to have the automation script 114 "follow" this execution path (i.e., successively take the system within the test container 202 from one state to the next along the path, until the final state of the path is reached). The task executions 412 and parameter assignments 405 recorded along the desired path of the generated test case 123 become part of the test case specification that is executed by the test environment 118, in particular by the test manager 120 and the test agent 214.

In addition to being generated based on a graph representation of the possible system states and transitions, test cases 123 are also generated based on customizable test coverage goals. The tester controls different coverage goals that have an influence on the size of the STG and the set of generated test cases 123. Graph models for testing automations can comprise complex branches (e.g., for different test input parameters) and are in general cyclic (to account for repeated execution). However, one or more embodiments utilize an acyclic graph in order to efficiently apply test generation to the STG. However, cyclic graphs are applicable as well.

The following are examples of test coverage goals for testing idempotence and convergence of automations. A first test coverage goal is idemN. This coverage parameter specifies a set of task sequence lengths for which idempotence is to be tested. The possible values range from idemN=1 (idempotence of only single tasks) to idemN=|A| (maximum sequence length covering all automation tasks). A second test coverage goal is repeat. This parameter controls the number of times each task is (at least) repeated. If the automation script 114 is supposed to converge after a single run it is usually sufficient to have repeatN=1. This is because many idempotence related problems are already detected after executing a task (or task sequence) twice. However, certain scenarios might require higher values for repeatN. For example, automation scripts 114 that are designed to be continuously repeated in order to eventually converge. The tester then uses domain knowledge to set a reasonable boundary for the number of repetitions to test.

A third test coverage goal is restart. This Boolean parameter determines whether tasks are arbitrarily repeated in the middle of the automation (restart=false), or the whole automation always gets restarted from scratch (restart=true). Consider the example above with the automation script 114 comprising the task sequence $\langle a_1, a_2, a_3, a_4 \rangle$. If idemN=3 with restart=true, then the test cases 123 can, for example, include the task sequences $\langle a_1, a_1, \ldots \rangle$, $\langle a_1, a_2, a_1, \ldots \langle, \rangle a_1, a_2, a_3, a_1, \ldots \rangle$. If restart=false, there are additional test cases, including $\langle a_1, a_2, a_3, a_2, a_3, \ldots \rangle$, $\langle a_1, a_2, a_3, a_4, a_2, a_3, \ldots \rangle$, etc.

A fourth test coverage goal is forcePre. This parameter specifies whether the constructed graph should enforce that different pre-states for each task are considered. If forcePre=true, then for each task a∈A and each potential pre-state s∈pre(a) there needs to exist a node in the STG, which is the case in FIG. 10. Note that the potential pre-state, in one embodiment, includes all post-states because of repeated task execution. Contrary, forcePre=false indicates that a wildcard can be used for each pre-state, which reduces the states in FIG. 10 from 9 to 5. The latter (forcePre=false) is a good baseline case if pre-states are unknown or hard to produce. Enforcing a certain pre-state, in one embodiment, either involves executing the task (if the desired pre-state matches a corresponding post-state) and/or accessing the system state directly.

A fifth test coverage goal is graph. This parameter refers to the STG-based coverage goal that should be achieved. In one embodiment, four testing goals (with increased level of coverage) are distinguished to derive test cases from state-based specifications. The first goal is Transition coverage, which requires that each transition in the graph is covered by (at least) one test case. The second goal is Full predicate coverage, which requires that one test case exists for each clause on each transition predicate. The clauses for the transition predicates in the STG of one or more embodiments comprise of 1) the task a∈A, which is executed to get from the pre-state to the post-state of the transition; and 2) the parameter input values for task a, which are used along the transition as shown in FIG. 10. The third goal is transition-pair coverage, which extends on transition coverage and ensures that for each state node all combinations of incoming and outgoing transitions are tested. The fourth goal is full sequence coverage, which requires that each possible (and relevant) execution path is tested. This coverage can be constrained by applying domain knowledge to ensure a finite set of tests. The testing environment 118 can configured be according to a default coverage goal such as, but not limited to, transition coverage on a cycle-free graph.

Figure 11:
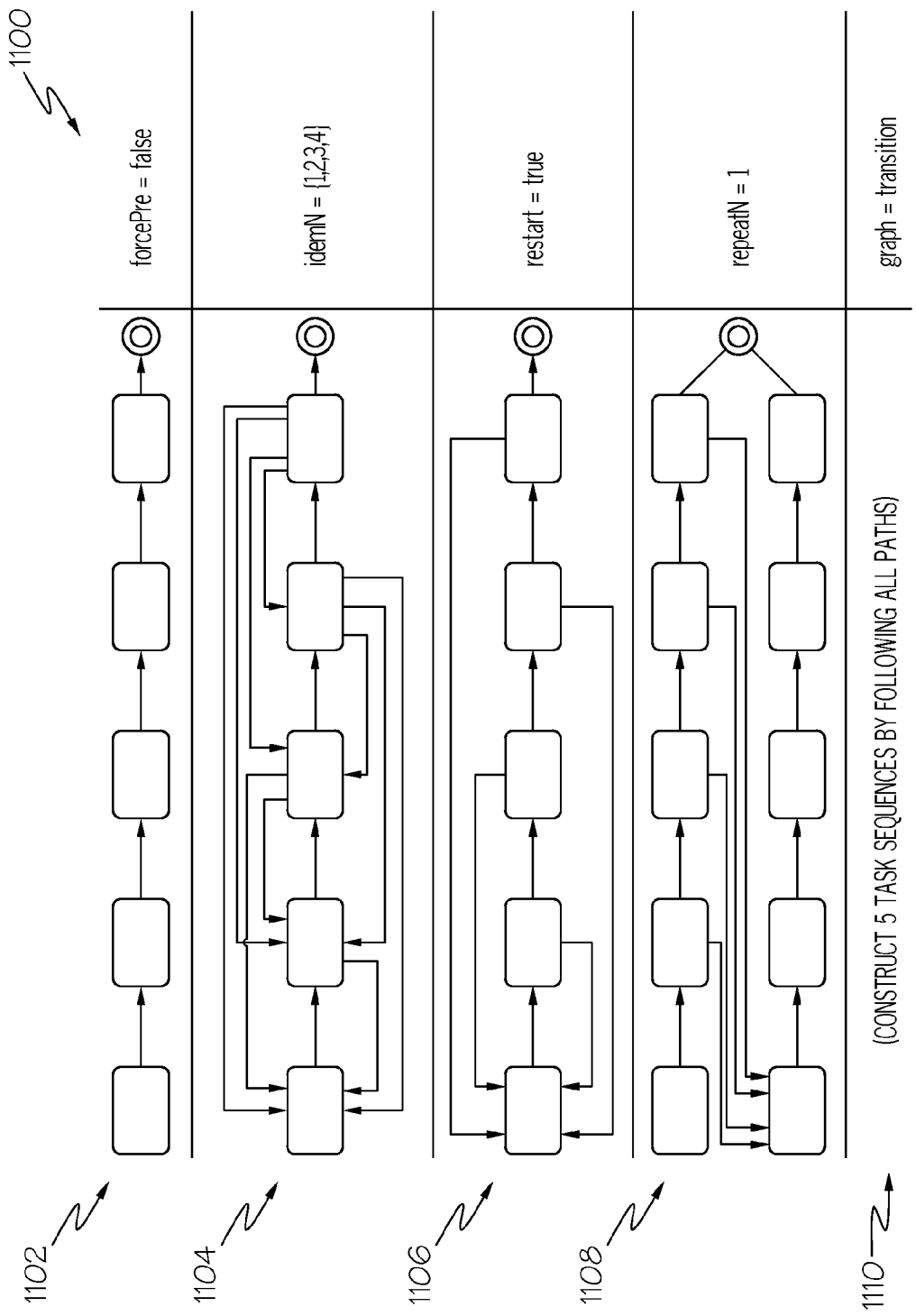
FIG. 11 illustrates one various sequences of adjusting a state transition graph according to test coverage goals for generating test cases to test the idempotence and convergence of a software automation script according to one embodiment of the present invention.

FIG. 11 illustrates one example of generating test cases from an STG 1100 based on coverage goals. The STG 1100 is based on the example of the automation script with 4 tasks $a_1$, $a_2$, a3, and $a_4$ given above. However, state properties and transition predicates have been left out for simplicity. In the example shown in FIG. 11 forcePre is set to false. This reduces the number of states as compared to the STG 1000 of FIG. 10. For example, the STG 1000 of FIG. 10 has 9 states where the STG 1102 has 5 states. Then, utilizing this STG 1102 the idemN parameter is applied such that any length of task sequences should be tested for idempotence (idemN={1, 2, 3, 4}), which introduces new transitions and cycles into the graph 1102 resulting in graph 1104. The configuration restart=true then removes part of the transitions resulting in the graph 1106 where cycles still remain. After the fourth configuration, repeatN=1, the maximum number of iterations are determines and an acyclic graph 1108 is constructed. Note that this procedure allows the highest level of coverage, full sequence coverage, to be applied. However, other transition coverage goals can be utilized as well.

To satisfy the graph=transition criterion the testing environment 118 performs a deep graph search to find any paths from the start node to the terminal node. Each generated execution path corresponds to one test case, and the transition predicates along the path correspond to the inputs for each task (e.g., MySQL password parameter p2 shown in FIG. 10). In one embodiment, alternative task parameter inputs 403 can be utilized, where input parameters 403 are mapped to transition predicates. Based on the above, 5 task sequences 1110 are constructed from the graph 1108. Each of these task sequences 1110 is a test case that configures the automation script 114 based on the states and parameters associated with each task sequence 1110.

As an example, consider the STG 1106 shown in FIG. 11. The STG 1106 comprises a total of 5 states (excluding the final state) that can be labeled s1, s2, . . . , s5; and 8 transitions between these states ((s1,s2), (s2,s3), (s3,s4), (s4,s5), (s2,s1), (s3,s1), (s4,s1), (s5,s1)). The first state s1 represents the pre-state of the first task 402 in the automation 114, and the last state s2 is the post state of the last task 402 defined in the automation 114. Test cases 123 are generated by following possible paths from the first state (s1) to the last state (s5) and recording the task sequences along the path. For example, one possible path covers the states (s1,s2,s3,s4,s5), which represents the default case in which the entire automation 114 is run once. Another possible path in the STG 1106 is (s1,s2,s3, s1,s2,s3,s4,s5). This path represents a test case in which the first two tasks 402 in the automation 114 are executed (effecting state transitions (s1,s2) and (s2,s3)), after which the automation 114 gets interrupted and starts from the beginning, again executing the first two tasks 402 (state transitions (s1, s2) and (s2,s3)) and then continuing with the third and the fourth task (effecting state transitions (s3,s4) and (s4,s5)).

Each generated test case 123 is maintained within one or more queues 122 of the testing manager 120. As discussed above, each generated/identified test case 123 is executed within its own separate test container 202, 204, 206, 208 as part of the repetition phase of the idempotence/convergence testing process, where two or more test cases can be executed in parallel. In one embodiment, the testing manager 120 initializes the testing host 104 such that any software packages required by each test case 123 are installed. Also, in one embodiment, a network bridge is created that routes the traffic of the containers' virtual network devices to the physical network device on the testing host 104. The initialization process for the prototype container 202, which acts as a template for new containers, configures the base operating system and common software packages required on all test containers 202, 204, 206, 208. The prototype container 202 also includes the executable code for the test agent. The prototype container 202 is reusable and remains unchanged when creating new containers 204, 206, 208. Therefore, the initialization of the prototype container 202 only needs to be performed once for a given automation script 114 under test. The test manager 120 initializes a new test container 204, 206, 208 by copying the complete root file system of the previously created prototype container 202 into a separate directory on the testing host 104. The test containers 202, 204, 206, 208 are then started as isolated processes in the host 104. To allow the containers 202, 204, 206, 208 to use the host's network connection, a virtual network interface is created in the test container that connects to the bridge created in the host initialization step.

The data provided to a test agent 214 within a test container 202, 204, 206, 208 for a test case 123 is the input parameters consumed by the tasks within a test case. For example, default parameters can be provided along with the metadata within the system model. In addition to input parameters, an indication of which tasks are to be repeated and in what order are also provided to the test agent 214. For example, given the path specification for a test case 123 the testing environment 118 traverses along the path and tracks the tasks that occur multiple times. From this information the testing environment 118 generates a list of tasks sequences that are to be repeated by the test case 123.

Figure 12:
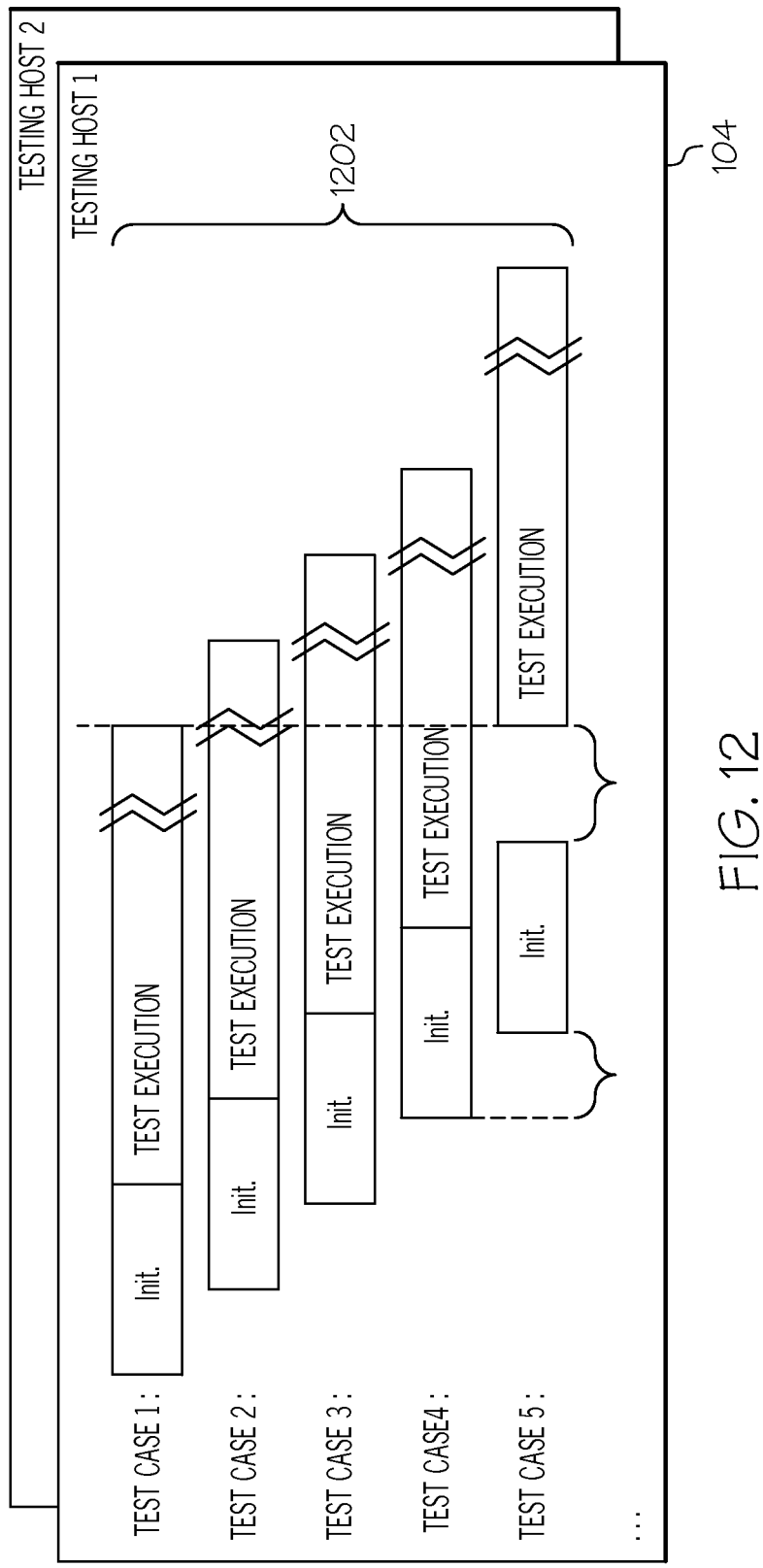
FIG. 12 illustrates one example of an execution pipeline for executing test cases according to one embodiment of the present invention.

In one embodiment, the test cases 123 in the queue 122 are processed in a pipeline 1202, as shown in FIG. 12. The pipeline 1202 ensures that there is at most one initialization active at any time. However, in other embodiments, multiple initializations of a test container 202, 204, 206, 208 run in parallel. After initialization each test container 202, 204, 206, 208 constitutes an isolated unit of work that does not interfere with other containers, and hence multiple test case executions can run in parallel.

As discussed above, an idempotent automation script 114 that is executed multiple times only has an effect at the first execution (under the assumption that there are no external influences on the system state). A converging automation script 114 always reaches a certain desired state, where the state to which the automation script 114 converges is the intersection of all post-states of any of the automation script' executions. The testing environment 118 tests these criteria by systematically repeating the automation script 114 utilizing the test cases 123 while observing the system state during each test case execution.

For example, in one embodiment, each test case 123 derived from the STG is executed at least twice. The expected behavior is that the system (as provided by the test container 202) converges to a desired state after the first run, and the second run has no effect on the system state because all tasks have already been done before. Under the assumption that automations do not depend on external influences such as the current date and time, repeating the automation once is sufficient and additional repetitions may have no extra benefit. Additionally, convergence of the automation is also tested when starting from any intermediate state. This type of test is important to reflect situations in which automations are abruptly terminated due to some problem in the environment (e.g., power outage, disk space exceeded) and have to be restarted from scratch.

In one embodiment, during idempotence and convergence testing (i.e., the repetition phase) the STG is extended as follows. With respect to testing convergence, for each intermediate state node N' that is not connected to the start node a new transition from N' to the start node is introduced. In other words, all state nodes, except for the pre-states immediately following the start node, are connected to the start node. Note that this introduces cycles into the graph. Therefore, in one embodiment, cycles are handled by limiting the number of loop iterations (e.g., limited to 2 iterations). This is because if an automation script 114 has been shown to converge after one run, it is expected to stay in that state for all following runs (except for rare problem cases). Hence, the new STG with cycles can be unrolled for a maximum of 2 iterations (i.e., during unrolling, the start node is not be passed more often than twice for any path in the graph). It should be noted that the number of loop iterations can be greater than 2. It should also be noted that cycles can be left in the graph as well.

With respect to testing for idempotence, for each state node N' that represents a post-state of some task t within an executing test case, the testing agents 214 ensures that the STG includes a node N" that represents a pre-state of the same task t and whose state is non-conflicting with the state of N' (see definition of non-conflicting given above). If such a node N" exists in the STG, the test agents 214 insert a transition (with empty transition condition) from N' to N". Otherwise, if no such node N" exists yet, the testing agents 214 create the new node N" and inserts a transition (with empty transition condition) from N' to the new node N". A transition (representing task t) from N" to N' is also inserted. Any cycles introduced into the graph can be handled as discussed above.

After the idempotence/convergence test cases 123 have been executed (corresponding to the STG-based test coverage criteria discussed above), idempotence, and convergence are determined as follows. The following discussion is based on the definition of idempotent task sequences and the definition of the convergent state of task sequences defined above. In the following, idempotence/convergence for task sequences $a_{seq} = \langle a_1, a_2, \ldots, a_n \rangle \in A^{\mathbb{N}}$ is considered. It should be noted that a single task can be expressed as a task sequence containing only this single task (n=1). For each task sequence $a_{seq} = \langle a_1, a_2, \ldots, a_n \rangle \in A^{\mathbb{N}}$, let $R_a$ denote the set of all automation runs (test cases 123) in which the task sequence has been executed (at least) two times successively. The test environment 118 constructs the set of automation runs with idempotent executions $I_a$ and non-idempotent executions $N_a$ for task sequence $a_{seq}$ as follows. For each automation run r in $R_t$, let $(e' = \langle e'_1, \ldots, e'_n \rangle, e'' = \langle e''_1, \ldots, e''_n \rangle)$ denote a pair of successive execution sequences of task sequence $a_{seq}$. The testing environment 118 adds r to $I_a$ if for all $i \in \{1, \ldots n\}$ either (1) task execution $e'_i$ has yielded an unsuccessful output result, denoted $o(e'_i)$=error, or (2) $o(e'_i)$=success and the post-state of $e''_i$ non-conflicting with the post-state of $e'_i$, denoted $\text{nonConf}(\text{post}(e''_i), \text{post}(e''_i))$ (see definition of non-conflicting states discussed above). Otherwise, if the above condition does not hold, the task sequence $a_{seq}$ is considered non-idempotent, and r is added to $N_a$.

Similar to the procedure for determining idempotence (see above), the testing environment 118 determines convergence of the automation 114 from the set of executed test cases 123, i.e., the set of automation runs 408. As defined above, the state union relation $(\cup_s)$ is utilized to express the union of a sequence of states (where latter states overwrite the property values of former states). Also as defined above, the convergent state of a task sequence $a_{seq} = \langle a_1, a_2, \ldots, a_n \rangle \in A^{\mathbb{N}}$ is a state $s_{conv} \in S$ for which holds that $s_{conv}$ is non-conflicting with the post-states union of all executions of $a_{seq}$:

$$\forall e_{seq} A^{\mathbb{N}} (e(a_1) \times e(a_2) \times \ldots \times e(a_n)),$$

$$s_{seq} = \langle \text{post}(e_{seq}[1]), \text{post}(e_{seq}[2]), \ldots, \text{post}(e_{seq}[n]) \rangle : \text{nonConf}(\cup_S(s_{seq}), s_{conv}).$$

To obtain the convergent state sconv of an automation 114 that consists of a task sequence aseq, sconv is initialized as an empty set (sconv=∅) and then the test environment 118 loops over all task execution sequences $e' = \langle e'_1, \ldots, e'_n \rangle$ of the task sequence aseq and merges the post-state properties into sconv as follows. Let sseq denote the post-state union of execution sequence e', $(k_1, v_1)$ any state property in sseq and $(k_2, v_2)$ any state property in sconv. If the key $k_1$ does not exist in sconv, then $(k_1, v_1)$ is added to sconv. Else if $k_1 = k_2$ and $\text{nonConf}((k_1, v_1), (k_2, v_2))$ holds but $\text{nonConf}((k_2, v_2), (k_1, v_1))$ does not hold, then $(k_2, v_2)$ is replaced by $(k_1, v_1)$ in sconv. If $k_1 = k_2$ and $\text{nonConf}((k_1, v_1), (k_2, v_2))$ and $\text{nonConf}((k_2, v_2), (k_1, v_1))$, then $(k_2, v_2)$ is removed from sconv. After this procedure has been repeated for all task execution sequences e', the automation 114 is determined as being convergent if the convergent state sconv is non-empty, otherwise the automation is non-convergent.

Figure 13:
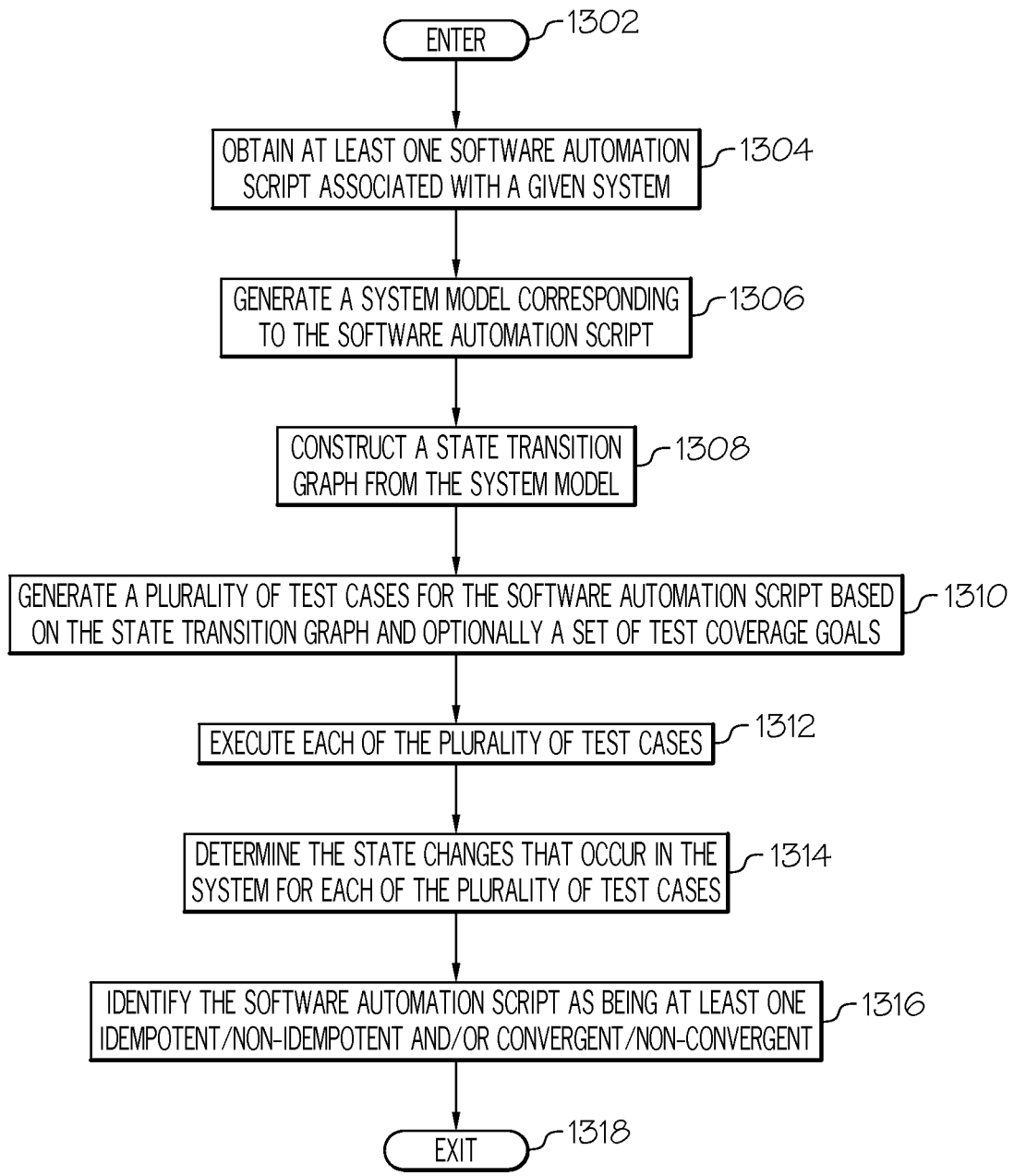
FIG. 13 is an operational flow diagram illustrating one process of testing a software automation script for impotence and/or convergence according to one embodiment of the present invention.

FIG. 13 is an operational flow diagram illustrating one example of a process for automatically testing a software automation script 114. The operational flow begins at step 1302 and flows directly to step 1304. The testing environment/module 118, at step 1304, obtains at least one software automation script 114 associated with a given system. As discussed above, the software automation script 114 comprises at least one sequence of tasks that when executed place the given system into a target state. The testing environment/module 118, at step 1306, generates a system model 400 corresponding to the software automation script 114. As discussed above, the system model 400 models the automation script 114 and the environment it operates in.

The testing environment/module 118, at step 1308, constructs at least one state transition graph 1000 from the system model 400. The state transition graph comprises a set of nodes, wherein each of the set of nodes represents one of the set of possible states of the given system. A directed edge connects one node from the set of nodes to another node in the set of nodes. A first subset of the set of nodes represents various initial states of the given system when the software automation script 114 is executed. A second subset of the set of nodes represents various post states of the given system after the software automation script 114 has been executed. A third subset of the set of nodes comprises nodes situated between at least one of the first subset and the second subset of the set of nodes. A path between one of the first subset and one of the second subset of the set of nodes represents an execution of the software automation script 114. A transition edge between any two of the set of nodes represents an execution of one of the plurality of tasks.

The testing environment/module 118 at step 1310 generates a plurality of test cases 123 for the software automation script 114 based on the state transition graph 400 and optionally a set of test coverage goals. The testing environment/module 118, at step 1312, executes each of the plurality of test cases 123. In one embodiment, each test case 123 is executed within an isolated environment such as a test container 202, 204, 206, 208. In one or more embodiments, two or more of the test cases 123 are executed in parallel. The testing environment/module 118, at step 1314, determines the state changes that occur in the system (as provided by the test container 202) for each of the plurality of test cases 123. For example, the testing environment/module 118 takes a snapshot of a system state before executing a task of test case 123 and a snapshot of the system state after the task has been executed. The snapshots are compared to determine how the state has changed. This is done for each task in the sequence of tasks for each test case 123.

The testing environment/module 118, at step 1316, identifies that the software automation script 114 is at least one of idempotent/non-idempotent and/or convergent/non-convergent based on executing the plurality of test cases 123. For example, the testing environment/module 118 determines that the software automation script 114 is idempotent based on determining that the sequence of executable tasks for each test case 123 yielded a non-conflicting state of the given system. The testing environment/module 118 determines that the software automation script 114 is non-idempotent based on determining that the sequence of executable tasks for at least one of the test cases 123 yielded a conflicting state of the given. The testing environment/module 118 determines that the software automation script 114 is convergent based on determining that the sequence of executable tasks for each test case 123 yielded a common state property of the state of the given system after the plurality of test cases were executed. The testing environment/module 118 determines that the software automation script 114 is non-convergent based on determining that the sequence of executable tasks for at least one test case 123 failed to yield a common state property of a state of the given system after the plurality of test cases were executed. The control flow exits at step 1318.

Figure 14:
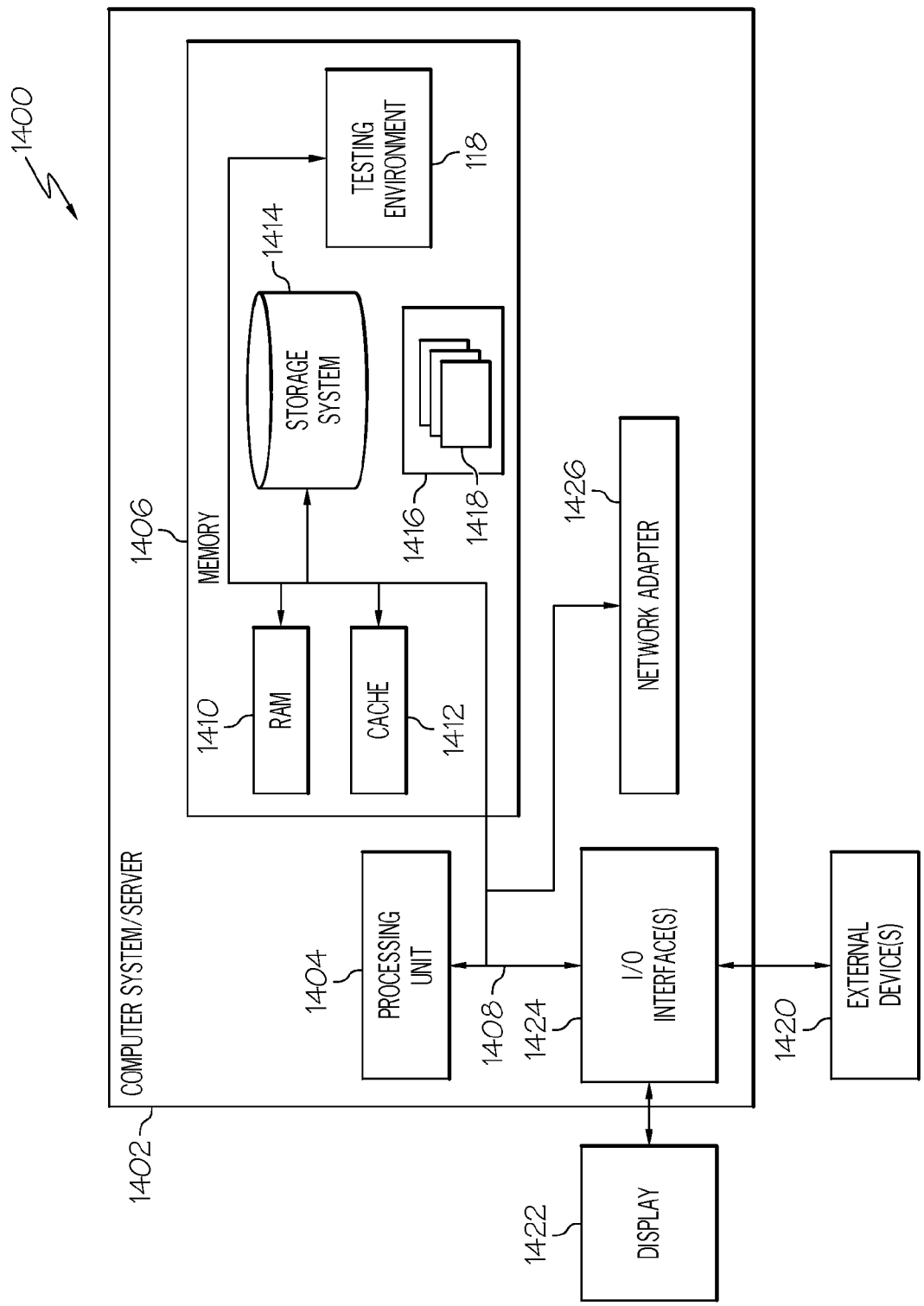
FIG. 14 is a block diagram illustrating a detailed view of an information processing system according to one embodiment of the present invention.

FIG. 14 illustrates one example of an information processing system 1402 that can be utilized in various embodiments of the present invention. The information processing system 1402 shown in FIG. 14 is only one example of a suitable system and is not intended to limit the scope of use or functionality of embodiments of the present invention described above. The information processing system 1402 of FIG. 14 is capable of implementing and/or performing any of the functionality set forth above. Any suitably configured processing system can be used as the information processing system 1402 in embodiments of the present invention.

As illustrated in FIG. 14, the information processing system 1402 is in the form of a general-purpose computing device. The components of the information processing system 1402 can include, but are not limited to, one or more processors or processing units 1404, a system memory 1406, and a bus 1408 that couples various system components including the system memory 1406 to the processor 1404.

The bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1406, in one embodiment, comprises the testing environment/module 118 and its components discussed above. The system memory 1406 can also comprise one or more of the databases 110, 112 discussed above as well. Even though FIG. 14 shows the testing environment/module 118 residing in the main memory, the testing environment/module 118 or at least one of its components can reside within the processor 1404, be a separate hardware component, and/or be distributed across a plurality of information processing systems and/or processors.

The system memory 1406 can also include computer system readable media in the form of volatile memory, such as random access memory (RAM) 1410 and/or cache memory 1412. The information processing system 1402 can further include other removable/non-removable, volatile/non-volatile computer system storage media. By way of example only, a storage system 1414 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1408 by one or more data media interfaces. The memory 1406 can include at least one program product having a set of program modules that are configured to carry out the functions of an embodiment of the present invention.

Program/utility 1416, having a set of program modules 1418, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. Program modules 1418 generally carry out the functions and/or methodologies of embodiments of the present invention.

The information processing system 1402 can also communicate with one or more external devices 1420 such as a keyboard, a pointing device, a display 1422, etc.; one or more devices that enable a user to interact with the information processing system 1402; and/or any devices (e.g., network card, modem, etc.) that enable computer system/server 1402 to communicate with one or more other computing devices. Such communication can occur via I/O interfaces 1424. Still yet, the information processing system 1402 can communicate with one or more networks such as a local area network (LAN), a general wide area network (WAN), and/or a public network (e.g., the Internet) via network adapter 1426. As depicted, the network adapter 1426 communicates with the other components of information processing system 1402 via the bus 1408. Other hardware and/or software components can also be used in conjunction with the information processing system 1402. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for testing of software automation scripts, the method comprising:
    obtaining at least one software automation script, wherein the software automation script comprises a sequence of executable tasks configured to automatically place a computing system into a target state comprising one or more state properties;
    executing a plurality of test cases for the software automation script, wherein each of the plurality of test cases is a separate executable instance of the software automation script configured to test the software automation script;
    analyzing the software automation script;
    identifying, based on the analyzing, a plurality of tasks to be performed during execution of the software automation script;
    determining a set of possible states of the computing system and a set of expected state transitions associated with each of the plurality of tasks;
    generating a state transition graph based on the set of possible states and the set of expected state transitions, wherein the state transition graph comprises:
        a set of nodes, wherein each of the set of nodes represents one of the set of possible states of the computing system,
        a set of directed edges, wherein each of the set of directed edges connects two in the set of nodes,
        a first subset of the set of nodes, wherein each of the first subset of the set of nodes represents an initial state of the computing system when the software automation script is executed,
        a second subset of the set of nodes, wherein each of the second subset of the set of nodes represents a post state of the computing system after the software automation script has been executed, and
        a third subset of the of the set of nodes, wherein each of the third subset of the set of nodes is situated between at least one of the first subset and the second subset of the set of nodes,
        wherein a path between one of the first subset and one of the second subset of the set of nodes represents an execution of the software automation script, and
        wherein a transition edge between any two of the set of nodes represents an execution of one of the plurality of tasks; and
    at least one of
        determining, based on executing the plurality of test cases, that the software automation script is one of idempotent and non-idempotent, and
        determining, based on executing the plurality of test cases, that the software automation script is one of convergent and non-convergent.

2. The method of claim 1, wherein executing each of the plurality of test cases comprises at least one of:
    executing two or more of the plurality of test cases in a separate virtual environment; and
    executing two or more of the plurality of test cases in parallel.

3. The method of claim 1, wherein at least one of the set of expected state transitions is determined based on a state of the computing system prior to the task being executed and a state of the computing system after the task has been executed.

4. The method of claim 1, further comprising:
    generating the plurality of tests cases based on the state transition graph, wherein each of the plurality of tests cases configures the separate instance of the software automation script with a set of automation parameters corresponding to
an initial state of the computing system represented by one of the first subset of the set of nodes, and
a path in the state transition graph, represented by the second and third subsets of the set of nodes, corresponding a set of state changes in the computing system effected by the automation script.

5. The method of claim 1, wherein determining that the software automation script is one of idempotent and non-idempotent comprises:
determining, based on executing the plurality of test cases, if the sequence of executable tasks for each separate instance of the software automation script yielded a non-conflicting state of the computing system;
determining that the software automation script is idempotent based on determining that the sequence of executable tasks for each separate instance of the software automation script yielded a non-conflicting state of the computing system; and
determining that the software automation script is non-idempotent based on determining that the sequence of executable tasks for at least one of the separate instances of the software automation script yielded a conflicting state of the computing system.

6. The method of claim 1, wherein determining that the software automation script is one of convergent and non-convergent comprises:
determining, based on executing the plurality of test cases, if the sequence of executable tasks for each separate instance of the software automation script yielded at least one common state property of a state of the computing system after the plurality of test cases were executed;
determining that the software automation script is convergent based on determining that the sequence of executable tasks for each separate instance of the software automation script yielded a common state property of the state of the computing system after the plurality of test cases were executed; and
determining that the software automation script is non-convergent based on determining that the sequence of executable tasks for at least one of the separate instances of the software automation script failed to yield a common state property of a state of the computing system after the plurality of test cases were executed.

7. The method of claim 1, wherein executing each of the plurality of test cases comprises at least:
executing each of two or more of the plurality of test cases in one of a separate virtual machine and a separate operating system container; and
capturing a set of changes effected on a state of the one of a separate virtual machine and a separate operating system container during execution of the two of more plurality of test cases.

8. The method of claim 1, wherein executing each of the plurality of test cases comprises at least:
executing two or more of the plurality of test cases in parallel, where state changes effected by executing a first of the two or more plurality of test cases do not interfere with state changes effected by executing at least a second of the two or more plurality of test cases.

* * * * *